(12) United States Patent
Shokri Razaghi et al.

(10) Patent No.: US 12,457,061 B2
(45) Date of Patent: Oct. 28, 2025

(54) METHODS AND APPARATUS FOR DISABLED HARQ PROCESSES

(71) Applicant: Telefonaktiebolaget LM Ericsson (publ), Stockholm (SE)

(72) Inventors: Hazhir Shokri Razaghi, Solna (SE); Xingqin Lin, San José, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 481 days.

(21) Appl. No.: 17/919,331

(22) PCT Filed: Mar. 24, 2022

(86) PCT No.: PCT/SE2022/050281
§ 371 (c)(1),
(2) Date: Oct. 17, 2022

(87) PCT Pub. No.: WO2022/203581
PCT Pub. Date: Sep. 29, 2022

(65) Prior Publication Data
US 2023/0163893 A1    May 25, 2023

Related U.S. Application Data

(60) Provisional application No. 63/166,304, filed on Mar. 26, 2021.

(51) Int. Cl.
*H04L 1/1829* (2023.01)
*H04L 1/1822* (2023.01)
*H04L 1/1867* (2023.01)

(52) U.S. Cl.
CPC .......... *H04L 1/1854* (2013.01); *H04L 1/1822* (2013.01); *H04L 1/1896* (2013.01)

(58) Field of Classification Search
CPC ... H04W 28/04; H04W 72/04; H04W 72/042; H04L 5/0007; H04L 1/1854; H04L 1/1822
(Continued)

(56) References Cited

U.S. PATENT DOCUMENTS 11,743,891 B2 * 8/2023 Lee ................... H04L 5/0094
370/329
11,770,840 B2 * 9/2023 Park ................... H04L 1/188
370/329

(Continued)

FOREIGN PATENT DOCUMENTS

CN    112511275 A  *  3/2021  ........... H04L 1/1812

OTHER PUBLICATIONS

3GPP TSG RAN WG1 #104-e, e-Meeting, Jan. 25-Feb. 5, 2021, R1-2100163, Source: OPPO, Title: HARQ enhancements, Agenda Item: 8.15.4. (Year: 2021).*

(Continued)

*Primary Examiner* — Peter G Solinsky
*Assistant Examiner* — Sanjay K Dewan
(74) *Attorney, Agent, or Firm* — Murphy, Bilak & Homiller, PLLC

(57) ABSTRACT

A method for a UE (1700) to transmit HARQ feedback for data transmissions from a wireless network is disclosed. The UE receives (1530), from the network, a first data message associated with a first HARQ process and a second data message associated with a second HARQ process. At least one of the first and second HARQ processes is disabled. The second data message is received after the first data message. The UE selectively transmits (1560), at a first occasion after the first data message, first HARQ feedback for the first data message based on whether the first HARQ process is enabled or disabled. The UE selectively transmits, at a (Continued)

second occasion after the second data message, second HARQ feedback for the second data message based on the following: whether the second HARQ process is enabled or disabled, an order of the first and second occasions, and an out-of-order scheduling restriction.

17 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0150181 A1* | 5/2019 | Kim | ...................... | H04L 1/1896 370/329 |
| 2022/0140950 A1* | 5/2022 | Babaei | .................... | H04L 1/188 370/329 |
| 2022/0140951 A1* | 5/2022 | He | ........................ | H04L 5/0055 370/329 |
| 2023/0082996 A1* | 3/2023 | Sarkis | ................... | H04L 1/1854 370/329 |
| 2023/0094711 A1* | 3/2023 | Wu | ........................ | H04L 1/1887 370/329 |
| 2023/0102142 A1* | 3/2023 | Kim | .................. | H04W 72/1263 370/329 |
| 2023/0129120 A1* | 4/2023 | MolavianJazi | ....... | H04L 1/1887 370/329 |
| 2023/0156704 A1* | 5/2023 | Wang | .................... | H04L 1/1861 370/329 |

OTHER PUBLICATIONS

3GPP TSG RAN WG1 #104e, e-Meeting, Jan. 25-Feb. 5, 2021, R1-2102143, Source: (ZTE), Title: Summary#4 of AI 8.4.3 for HARQ for NTN, Agenda Item: 8.4.3. (Year: 2021).*
3GPP TSG RAN meeting #80, La Jolla, USA, Jun. 11-14, 2018, RP-181370, Source: Thales, Title: Study on solns evaln for NR to support NTN, Type: SID new, Agenda Item: solutions evaln for NR to support NTN, moderator: Thales. (Year: 2018).*
"3GPP TR 38.811 V15.4.0", 3rd Generation Partnership Project; Technical Specification Group Radio Access Network; Study on New Radio (NR) to support non-terrestrial networks (Release 15), Sep. 2020, pp. 1-47.
"3GPP TS 38.211 V16.1.0", 3rd Generation Partnership Project; Technical Specification Group Radio Access Network; NR; Physical channels and modulation (Release 16), Mar. 2020, pp. 1-130.
"3GPP TS 38.214 V15.0.0", 3rd Generation Partnership Project; Technical Specification Group Radio Access Network; NR; Physical layer procedures for data (Release 15), Dec. 2017, pp. 1-71.
"3GPP TS 38.214 V16.4.0", 3rd Generation Partnership Project; Technical Specification Group Radio Access Network; NR; Physical layer procedures for data (Release 16), Dec. 2020, pp. 1-169.
"Discussion on HARQ enhancements", 3GPP TSG RAN WG1 #104-e, R1-2100163, e-Meeting, Jan. 25-Feb. 5, 2021, pp. 1-2.
"Summary#4 of AI 8.4.3 for HARQ for NTN", 3GPP TSG RAN WG1 #104e; R1-2102143; e-Meeting, Jan. 25-Feb. 5, 2021, pp. 1-49.
"3GPP TR 38.811 V15.1.0", 3rd Generation Partnership Project; Technical Specification Group Radio Access Network; Study on New Radio (NR) to support non-terrestrial networks (Release 15), Jun. 2019, pp. 1-126.
"3GPP TS 23.501 V15.5.0", 3rd Generation Partnership Project; Technical Specification Group Services and System Aspects; System Architecture for the 5G System; Stage 2 (Release 15), Mar. 2019, pp. 1-241.
"Study on solutions evaluation for NR to support Non Terrestrial Network", 3GPP TSG RAN meeting #80, RP-181370, La Jolla, USA, Jun. 11-14, 2018, pp. 1-5.

* cited by examiner

METHODS AND APPARATUS FOR DISABLED HARQ PROCESSES

TECHNICAL FIELD

The present disclosure generally relates to wireless communication networks, and more specifically to techniques for providing reliable data transmissions from wireless devices to a wireless network, including hybrid ARQ (HARQ) techniques used in for example in non-terrestrial networks (NTNs) that have long signal propagation delays.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases.

FIG. 1 illustrates an exemplary high-level view of the 5G network architecture, consisting of a Next Generation RAN (NG-RAN) 199 and a 5G Core (5GC) 198. NG-RAN 199 can include a set of gNodeB's (gNBs) connected to the 5GC via one or more NG interfaces, such as gNBs 100, 150 connected via interfaces 102, 152, respectively. In addition, the gNBs can be connected to each other via one or more Xn interfaces, such as Xn interface 140 between gNBs 100 and 150. With respect the NR interface to user equipments (UEs), each of the gNBs can support frequency division duplexing (FDD), time division duplexing (TDD), or a combination thereof.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP shall be applied.

The NG RAN logical nodes shown in FIG. 1 include a central (or centralized) unit (CU or gNB-CU) and one or more distributed (or decentralized) units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 122 and 132 shown in FIG. 1. The gNB-CU and connected gNB-DUs are only visible to other gNBs and the 5GC as a gNB. In other words, the F1 interface is not visible beyond gNB-CU.

FIG. 2 shows a high-level view of an exemplary 5G network architecture, including a Next Generation Radio Access Network (NG-RAN) 299 and a 5G Core (5GC) 298. As shown in the figure, NG-RAN 299 can include gNBs 210 (e.g., 210a,b) and ng-eNBs 220 (e.g., 220a,b) that are interconnected with each other via respective Xn interfaces. The gNBs and ng-eNBs are also connected via the NG interfaces to 5GC 298, more specifically to the AMF (Access and Mobility Management Function) 230 (e.g., AMFs 230a, b) via respective NG-C interfaces and to the UPF (User Plane Function) 240 (e.g., UPFs 240a,b) via respective NG-U interfaces. Moreover, the AMFs 230a,b can communicate with one or more policy control functions (PCFs, e.g., PCFs 250a,b) and network exposure functions (NEFs, e.g., NEFs 260a,b).

Each of the gNBs 210 can support the NR radio interface including frequency division duplexing (FDD), time division duplexing (TDD), or a combination thereof. Each of ng-eNBs 220 can support the fourth-generation (4G) Long-Term Evolution (LTE) radio interface. Unlike conventional LTE eNBs, however, ng-eNBs 220 connect to the 5GC via the NG interface. Each of the gNBs and ng-eNBs can serve a geographic coverage area including one more cells, such as cells 211a-b and 221a-b shown in FIG. 2. Depending on the particular cell in which it is located, a user equipment (UE) 205 can communicate with the gNB or ng-eNB serving that particular cell via the NR or LTE radio interface, respectively. Although FIG. 2 shows gNBs and ng-eNBs separately, it is also possible that a single NG-RAN node provides both types of functionality.

5G/NR technology shares many similarities with LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

In addition to providing coverage via cells as in LTE, NR networks also provide coverage via "beams." In general, a downlink (DL, i.e., network to UE) "beam" is a coverage area of a network-transmitted reference signal (RS) that may be measured or monitored by a UE. In NR, for example, RS can include any of the following: synchronization signal/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection.

FIG. 3 shows an exemplary configuration of NR user plane (UP) and control plane (CP) protocol stacks between a UE, a gNB, and an AMF, such as those shown in FIGS. 1-2. The Physical (PHY), Medium Access Control (MAC), Radio Link Control (RLC), and Packet Data Convergence Protocol (PDCP) layers between the UE and the gNB are common to UP and CP. The PDCP layer provides ciphering/ deciphering, integrity protection, sequence numbering, reordering, and duplicate detection for both CP and UP. In addition, PDCP provides header compression and retransmission for UP data.

On the UP side, Internet protocol (IP) packets arrive to the PDCP layer as service data units (SDUs), and PDCP creates protocol data units (PDUs) to deliver to RLC. In addition, the Service Data Adaptation Protocol (SDAP) layer handles quality-of-service (QoS) including mapping between QoS flows and Data Radio Bearers (DRBs) and marking QoS flow identifiers (QFI) in UL and DL packets.

When each IP packet arrives, PDCP starts a discard timer. When this timer expires, PDCP discards the associated SDU and the corresponding PDU. If the PDU was delivered to RLC, PDCP also indicates the discard to RLC. The RLC layer transfers PDCP PDUs to the MAC through logical channels (LCH). RLC provides error detection/correction, concatenation, segmentation/reassembly, sequence numbering, reordering of data transferred to/from the upper layers. If RLC receives a discard indication from associated with a PDCP PDU, it will discard the corresponding RLC SDU (or any segment thereof) if it has not been sent to lower layers.

The MAC layer provides mapping between LCHs and PHY transport channels, LCH prioritization, multiplexing into or demultiplexing from transport blocks (TBs), hybrid ARQ (HARM) error correction, and dynamic scheduling (on gNB side). The PHY layer provides transport channel services to the MAC layer and handles transfer over the NR radio interface, e.g., via modulation, coding, antenna mapping, and beam forming.

On CP side, the non-access stratum (NAS) layer is between UE and AMF and handles UE/gNB authentication, mobility management, and security control. The RRC layer sits below NAS in the UE but terminates in the gNB rather than the AMF. RRC controls communications between UE and gNB at the radio interface as well as the mobility of a UE between cells in the NG-RAN. RRC also broadcasts system information (SI) and performs establishment, configuration, maintenance, and release of DRBs and Signaling Radio Bearers (SRBs) and used by UEs. Additionally, RRC controls addition, modification, and release of carrier aggregation (CA) and dual-connectivity (DC) configurations for UEs. RRC also performs various security functions such as key management.

After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives SI broadcast in the cell where the UE is camping, performs measurements of neighbor cells to support cell reselection, and monitors a paging channel on PDCCH for pages from 5GC via gNB. An NR UE in RRC_IDLE state is not known to the gNB serving the cell where the UE is camping. However, NR RRC includes an RRC_INACTIVE state in which a UE is known (e.g., via UE context) by the serving gNB. RRC_INACTIVE has some properties similar to a "suspended" condition used in LTE.

To support mobility (e.g., handover or reselection) between cells and/or beams, a UE can perform periodic cell search and measurements of signal power and/or quality (e.g., reference signal received power, RSRP, and reference signal received quality, RSRQ) in RRC_CONNECTED, RRC_IDLE, and RRC_INACTIVE states. The UE is responsible for detecting new neighbor cells and for tracking and monitoring already detected cells. The detected cells and the associated measurement values are reported to the network. A non-connected UE in RRC_IDLE or RRC_INACTIVE state performs such measurements only SSB. A UE in RRC_CONNECTED state can perform such measurements on additional DL RS including CSI-RS, PRS, DMRS, PTRS, etc.

Hybrid ARQ (HARQ) is an important feature for NR. When combined with link adaptation through channel state information (CSI) feedback, HARQ enables efficient, reliable, and low-delay data transmission in NR networks. In HARQ, a receiver of a first data packet replies to the sender with a positive (ACK) or a negative (NACK) acknowledgement (also referred to as feedback), depending on whether the receiver correctly decoded the first packet. Based on receiving an ACK, the sender will transmit a second packet (if available). Based on receiving a NACK, the sender will retransmit either the same version or a different version of the first data packet. If needed, a single data packet can be retransmitted multiple times. In this manner, HARQ can improve the reliability of transmissions from the sender to the receiver, albeit with increased complexity and/or latency for a correctly-decoded packet.

In Rel-15, 3GPP also started preparing NR for operation in Non-Terrestrial Networks (NTNs), such as satellite networks. The work was performed within the study item "NR to support Non-Terrestrial Networks" and resulted in publication of 3GPP TR 38.811 (v15.1.0). The work to prepare NR for NTN operation continued in Rel-16 under the study item "Solutions for NR to support Non-Terrestrial Network". 3GPP is also considering introducing NTN support for LTE and NR in Rel-17.

Even so, current LTE and NR technologies were developed for terrestrial wireless networks, and adapting them to NTNs can create various issues, problems, and/or drawbacks for operation of networks and UEs. As a more specific example, signal propagation delays in NTNs are typically much longer than in terrestrial wireless networks, which can cause various problems for HARQ. Although various solutions have been proposed, all have shortcomings. Accordingly, improved HARQ techniques are needed for NTNs, preferably techniques that can also provide improvements to HARQ operation in terrestrial wireless networks.

SUMMARY

Embodiments of the present disclosure provide specific improvements to communication between user equipment (UE) and network nodes in a wireless network, such as by providing, enabling, and/or facilitating solutions to overcome exemplary problems summarized above and described in more detail below.

Embodiments include methods (e.g., procedures) for a user equipment (UE) configured to transmit hybrid ARQ (HARQ) feedback for data transmissions from a wireless network. In some embodiments, the wireless network can be a non-terrestrial network (NTN).

These exemplary methods can include receiving, from the wireless network, a first data message associated with a first HARQ process and a second data message associated with a second HARQ process. At least one of the first and second HARQ processes is disabled, and the second data message is received after the first data message. These exemplary methods can also include selectively transmitting, at a first occasion after the first data message, first HARQ feedback for the first data message based on whether the first HARQ process is enabled or disabled. These exemplary methods can also include selectively transmitting, at a second occasion after the second data message, second HARQ feedback for the second data message based on the following: whether the second HARQ process is enabled or disabled, an order of the first and second occasions, and an out-of-order scheduling restriction.

In some embodiments, the first and second data messages are first and second physical downlink shared channels (PDSCHs). In such embodiments, the out-of-order scheduling restriction comprises that the UE is not expected to receive the first PDSCH in slot i, with the first HARQ feedback assigned to be transmitted in slot j, and the second PDSCH starting later than the first PDSCH with the second HARQ feedback assigned to be transmitted in a slot before slot j.

In some embodiments, the selectively transmitting operations can include transmitting the first HARQ feedback when the first HARQ process is enabled, and refraining from transmitting the first HARQ feedback when the first HARQ process is disabled.

In some embodiments, these exemplary methods can also include attempting to decode the first and second data messages and determining the first and second HARQ feedback based on whether the respective decoding attempts are successful or unsuccessful and whether the respective first and second HARQ processes are enabled. In some of these embodiments, each of the first and second HARQ feedback can be determined as:
 a first value (e.g., ACK) or a second value (e.g., NACK) based on whether the decoding attempt for the corresponding data message is successful or unsuccessful, respectively, when the corresponding HARQ process is enabled; and
 only one of the first and second values (e.g., ACK or NACK) regardless of whether the decoding attempt for the corresponding data message is successful or unsuccessful, when the corresponding HARQ process is disabled.

In some embodiments, the out-of-order scheduling restriction applies to the first and second data messages. In such case, when the second occasion is not before the first occasion, the second HARQ feedback is selectively transmitted based on whether the second HARQ process is enabled or disabled. Likewise, when the second occasion is before the first occasion, the second HARQ feedback is not transmitted.

In some embodiments, these exemplary methods can also include receiving the following from the wireless network: first downlink control information (DCI) scheduling the first data message associated with the first HARQ process, and second DCI scheduling the second data message associated with the second HARQ process. Each of the first and second DCIs includes a first field that indicates a HARQ process and a second field arranged to indicate an occasion for the UE to transmit HARQ feedback for a data message associated with the HARQ process indicated by the first field.

In some embodiments, the out-of-order scheduling restriction applies to the first and second data messages and the second field of each of the first and second DCIs indicates an occasion for the UE to transmit HARQ feedback.

In other embodiments, these exemplary methods can also include receiving, from the wireless network, a radio resource control (RRC) message that includes a dl-DataToUL-ACK parameter that identifies a common scheduling delay. The out-of-order scheduling restriction may apply to the first and second data messages, and the common scheduling delay may indicate the first and second occasions (i.e., regardless of whether the processes are enabled/disabled).

Other embodiments include exemplary methods (e.g., procedures) for a network node in a wireless network to receive HARQ feedback from a UE for data transmissions by the network node. In some embodiments, the wireless network can be a non-terrestrial network (NTN).

These exemplary methods can include selecting, based on an out-of-order scheduling restriction, a first occasion for the UE to transmit first HARQ feedback for a first data message associated with a first HARQ process, and a second occasion for the UE to transmit second HARQ feedback for a second data message associated with a second HARQ process. At least one of the first and second HARQ processes is disabled.

These exemplary methods can also include transmitting, to the UE, the first data message, the second data message, and at least one of an indication of the first occasion and an indication of the second occasion. The second data message is transmitted after the first data message.

In some embodiments, the first and second data messages are first and second physical downlink shared channels (PDSCHs). In such embodiments, the out-of-order scheduling restriction comprises that the UE is not expected to receive the first PDSCH in slot i, with the first HARQ feedback assigned to be transmitted in slot j, and the second PDSCH starting later than the first PDSCH with the second HARQ feedback assigned to be transmitted in a slot before slot j.

In some embodiments, the out-of-order scheduling restriction applies to the first and second data messages. In such embodiments, these exemplary methods can also include selectively receiving the second HARQ feedback from the UE, at the second occasion, based on the order of the first and second occasions and on whether the second HARQ process is enabled or disabled.

In some of these embodiments, the selectively receiving operations can include receiving the second HARQ feedback when the second HARQ process is enabled and the second occasion is not before the first occasion but otherwise, refraining from receiving the second HARQ feedback. In other of these embodiments, the selectively receiving operations can include:
 when the second HARQ process is enabled, receiving a first value (e.g., ACK) and a second value (e.g., NACK) when UE decoding of the second data message was successful and unsuccessful, respectively; and
 when the second HARQ process is disabled, receiving only one of the first and second values (e.g., ACK or NACK) regardless of whether UE decoding of the second data message was successful or unsuccessful.

In some embodiments, the transmitting operations can include transmitting the following to the UE: first downlink control information (DCI) scheduling the first data message associated with the first HARQ process, and second DCI scheduling the second data message associated with the second HARQ process. Each of the first and second DCIs includes a first field that indicates a HARQ process and a second field arranged to indicate an occasion for the UE to transmit HARQ feedback for a data message associated with the HARQ process indicated by the first field.

In some of these embodiments, the out-of-order scheduling restriction applies to the first and second data messages and the second field of each DCI indicates an occasion for the UE to transmit HARQ feedback.

In other embodiments, the transmitting operations can include transmitting, to the UE, a radio resource control (RRC) message that includes a dl-DataToUL-ACK parameter that identifies a common scheduling delay. The out-of-order scheduling restriction may apply to the first and second data messages, and the common scheduling delay may indicate the first and second occasions (i.e., regardless of whether the processes are enabled/disabled).

Other embodiments include UEs (e.g., wireless devices) and network nodes (e.g., base stations, eNBs, gNBs, ng-eNBs, gateways, satellites, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other embodiments described herein can improve reliability of data transmissions through enhanced HARQ performance, such as by addressing scheduling restrictions for PDSCH and corresponding HARQ feedback when one or more of a UE's HARQ processes are disabled. For example, embodiments can facilitate sufficient processing time for UE reception of data messages (e.g., PDSCH) associated with different HARQ processes, as well as flexibility in network scheduling and/or UE transmission of HARQ feedback when at least one of the UE's HARQ processes are disabled. Such embodiments can be particularly beneficial in NTNs having long signal propagation delays.

These and other objects, features, and advantages of embodiments of the present disclosure will become apparent upon reading the following Detailed Description in view of the Drawings briefly described below.

DETAILED DESCRIPTION

Figure 1:
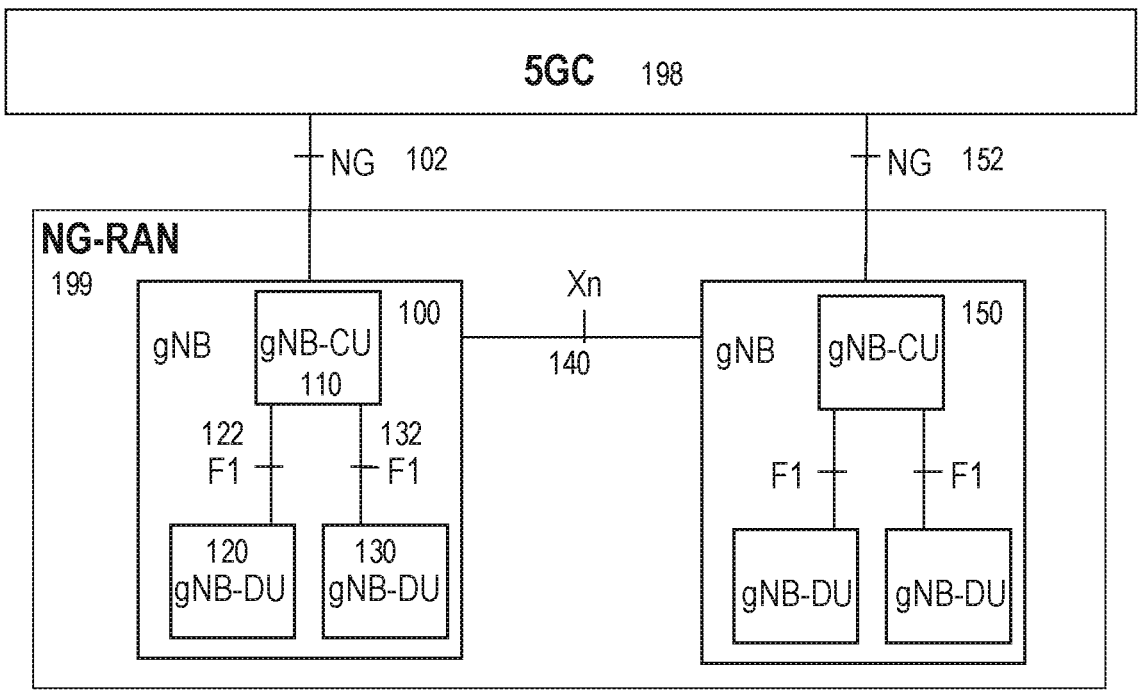
FIGS. 1-2 illustrate two high-level views of an exemplary 5G/NR network architecture.
Figure 2:
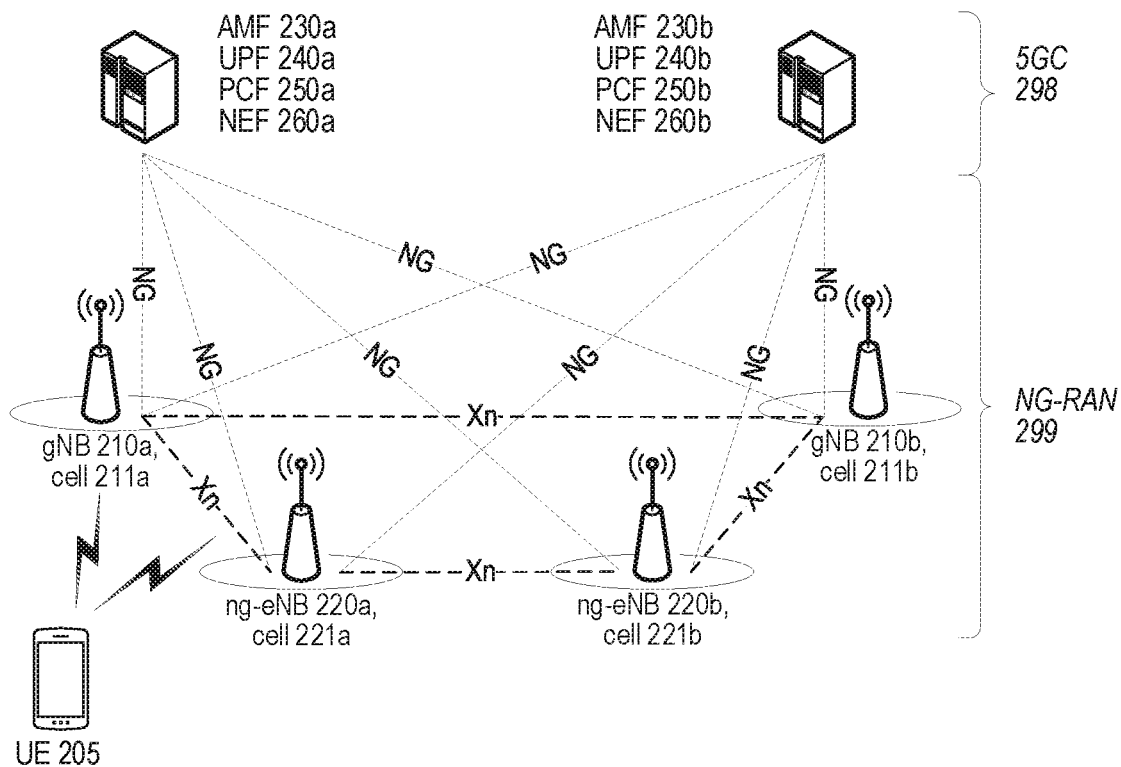
Figure 3:
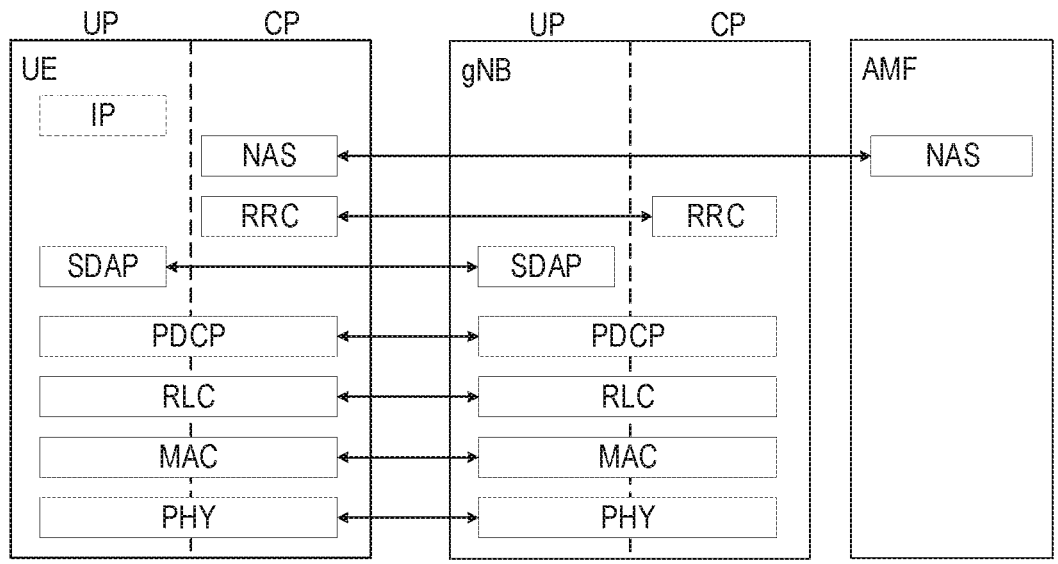
FIG. 3 shows an exemplary configuration of NR user plane (UP) and control plane (CP) protocol stacks.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a radio access node or a wireless device."

Node: As used herein, a "node" can be a network node or a wireless device.

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), a relay node, a satellite, a gateway, etc.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), machine type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

NR DL and UL physical resources are organized into equal-sized 1-ms subframes. A subframe is further divided into multiple slots of equal duration, with each slot including multiple OFDM-based symbols. An NR slot can include 14 OFDM symbols for normal cyclic prefix and 12 symbols for extended cyclic prefix. A resource block (RB) consists of a group of 12 contiguous OFDM subcarriers for a duration of a 12- or 14-symbol slot. A resource element (RE) corresponds to one OFDM subcarrier during one OFDM symbol interval.

In Rel-15 NR, a UE can be configured with up to four carrier bandwidth parts (BWPs) in the DL with a single DL BWP being active at a given time. A UE can be configured with up to four BWPs in the UL with a single UL BWP being active at a given time. If a UE is configured with a supplementary UL, the UE can be configured with up to four additional BWPs in the supplementary UL, with a single supplementary UL BWP being active at a given time.

Common RBs (CRBs) are numbered from 0 to the end of the carrier bandwidth. Each BWP configured for a UE has a common reference of CRB0, such that a configured BWP may start at a CRB greater than zero. CRB0 can be identified by one of the following parameters provided by the network, as further defined in 3GPP TS 38.211 section 4.4:

PRB-index-DL-common for DL in a primary cell (PCell, e.g., PCell or PSCell);
PRB-index-UL-common for UL in a PCell;
PRB-index-DL-Dedicated for DL in a secondary cell (SCell);
PRB-index-UL-Dedicated for UL in an SCell; and
PRB-index-SUL-common for a supplementary UL.

In this manner, a UE can be configured with a narrow BWP (e.g., 10 MHz) and a wide BWP (e.g., 100 MHz), each starting at a particular CRB, but only one BWP can be active for the UE at a given point in time. Within a BWP, PRBs are defined and numbered in the frequency size domain from 0 to $N_{BWP,i}^{size}-1$, where i is the index of the particular BWP for the carrier.

NR supports various SCS values $\Delta f=(15\times2^\mu)$ kHz, where $\mu\in(0,1,2,3,4)$ are referred to as "numerologies." Numerology $\mu=0$ (i.e., $\Delta f=15$ kHz) provides the basic (or reference) SCS that is also used in LTE. The symbol duration, cyclic prefix (CP) duration, and slot duration are inversely related to SCS or numerology. For example, there is one (1-ms) slot per subframe for $\Delta f=15$ kHz, two 0.5-ms slots per subframe for $\Delta f=30$ kHz, etc. In addition, the maximum carrier bandwidth is directly related to numerology according to $2^\mu*50$ MHz. Table 1 below summarizes the supported NR numerologies and associated parameters. Different DL and UL numerologies can be configured by the network.

TABLE 1

| μ | $\Delta f = 2^\mu \cdot 15$ (kHz) | Cyclic prefix (CP) | CP duration | Symbol duration | Symbol + CP | Slot duration | Max carrier BW |
|---|---|---|---|---|---|---|---|
| 0 | 15 | Normal | 4.69 μs | 66.67 μs | 71.35 μs | 1 ms | 50 MHz |
| 1 | 30 | Normal | 2.34 μs | 33.33 μs | 35.68 μs | 0.5 ms | 100 MHz |
| 2 | 60 | Normal, Extended | 1.17 μs | 16.67 μs | 17.84 μs | 0.25 ms | 200 MHz |
| 3 | 120 | Normal | 0.59 μs | 8.33 μs | 8.92 μs | 125 μs | 400 MHz |
| 4 | 240 | Normal | 0.29 μs | 4.17 μs | 4.46 μs | 62.5 μs | 800 MHz |

Figure 4:
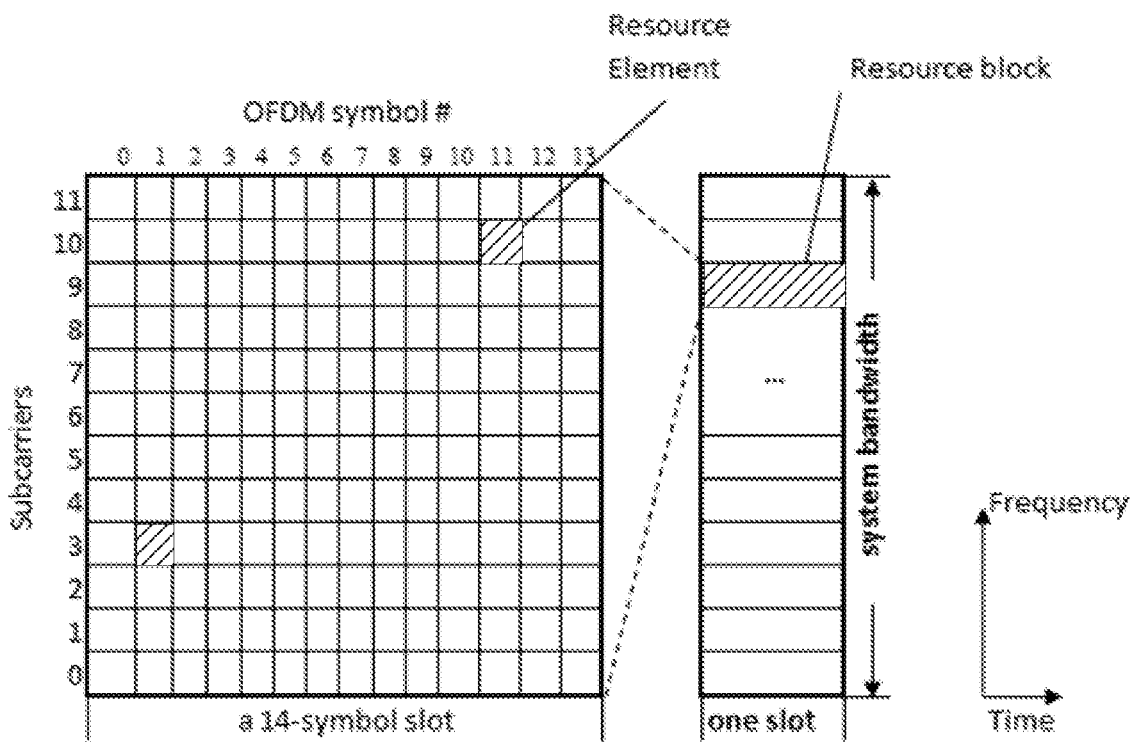
FIG. 4 shows an exemplary time-frequency resource grid for an NR slot.

FIG. 4 shows an exemplary time-frequency resource grid for an NR slot. As illustrated in FIG. 4, a resource block (RB) consists of a group of 12 contiguous OFDM subcarriers for a duration of a slot, i.e., 14 OFDM symbols for normal CP and 12 symbols for extended CP. An NR slot can also be arranged with various combinations of UL and DL symbols. Options can include DL-only slots (i.e., no UL transmission) with on-time (symbol 0) or late (symbol>0) starts, "DL-heavy" slots (e.g., one UL symbol), and "UL-heavy" slot with a single DL symbol carrying DL control information. Various guard periods before initial DL symbols ($T_{UL-DL}$) and before initial UL symbols ($T_{DL-UL}$) can also be used.

In addition, NR includes a Type-B scheduling, also known as "mini-slots." These are shorter than slots, typically ranging from one symbol up to one less than the number of symbols in a slot (e.g., 11 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 5:
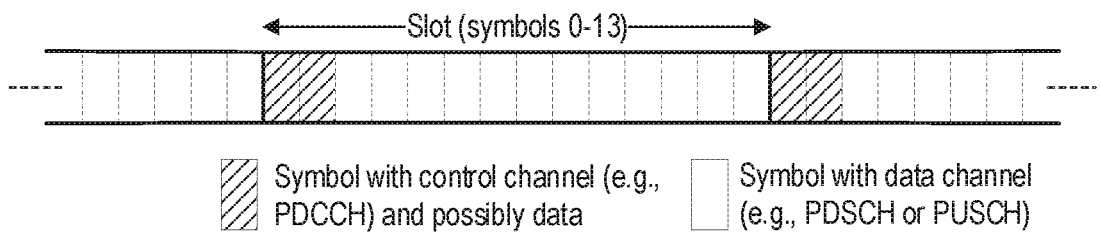
FIG. 5 shows another exemplary NR slot structure.

FIG. 5 shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 5, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in an LTE subframe. In NR, however, each REG consists of all 12 REs of one OFDM symbol in an RB, whereas an LTE REG includes only four REs. Like in LTE, the CORESET time domain size can be indicated by PCFICH. In LTE, the frequency bandwidth of the control region is fixed (i.e., to the total system bandwidth), whereas the frequency bandwidth of the NR CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 5 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be performed dynamically, e.g., on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

For example, to determine the modulation order, target code rate, and TB size(s) for a scheduled PDSCH transmission, the UE first reads the 5-bit modulation and coding scheme field ($I_{MCS}$) in the DCI (e.g., formats 1_0 or 1_1) to determine the modulation order ($Q_m$) and target code rate (R) based on the procedure defined in 3GPP TS 38.214 V15.0.0 clause 5.1.3.1. Subsequently, the UE reads the redundancy version field (rv) in the DCI to determine the redundancy version. Based on this information together with the number of layers ($\upsilon$) and the total number of allocated PRBs before rate matching ($n_{PRB}$), the UE determines the Transport Block Size (TBS) for the PDSCH according to the procedure defined in 3GPP TS 38.214 V15.0.0 clause 5.1.3.2. Similar techniques can be used by the UE for PUSCH transmission scheduled by DCI (e.g., formats 0_0 or 0_1).

DCI can also include information about various timing offsets (e.g., in slots or subframes) between PDCCH and PDSCH, PUSCH, HARQ, and/or channel state information reference signals (CSI-RS). For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and a responsive UE HARQ feedback (i.e., ACK/NACK) on PUSCH. In addition, offset K3 represents the number of slots between this responsive ACK/NACK and a corresponding retransmission of data on PDSCH. In addition, offset K2 represents the number of slots between the UE's reception of a UL grant DCI (e.g., formats 0_0 or 0_1) on PDCCH and the subsequent PUSCH transmission. Each of these offsets can take on values of zero and positive integers.

Figure 6:
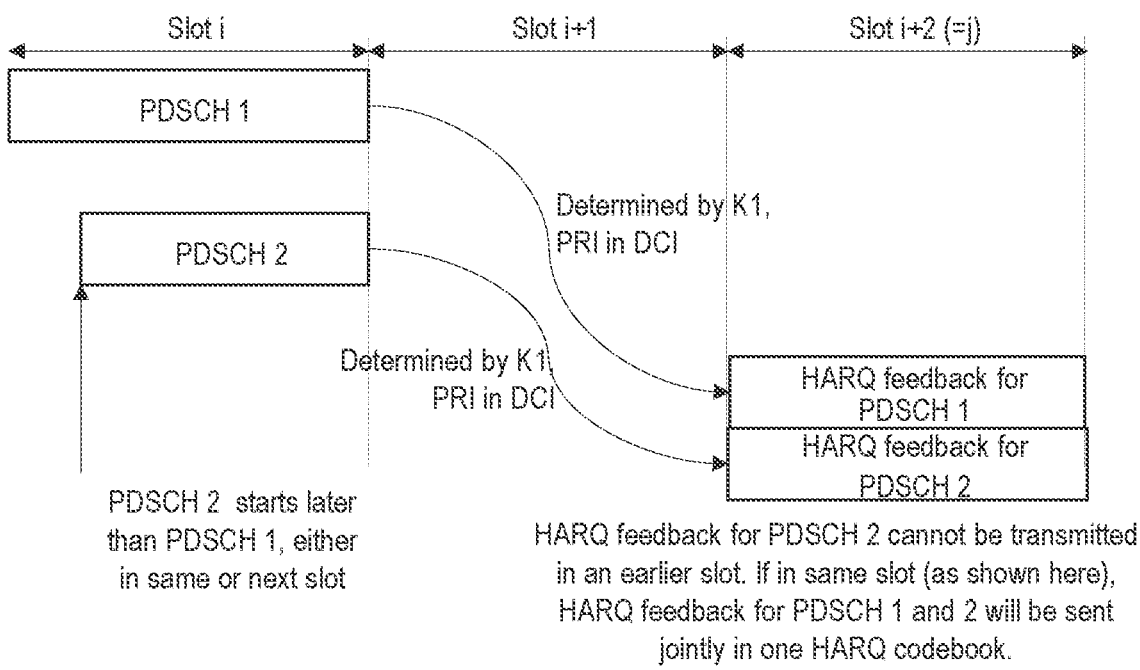
FIG. 6 illustrates an "out-of-order scheduling restriction" for hybrid ARQ feedback for physical downlink shared channel (PDSCH) transmissions associated with different HARQ process identifiers (IDs).

3GPP TS 38.214 (v16.4.0, section 5.1) defines a so-called "out-of-order scheduling restriction" for transmission of PDSCHs with different HARQ process IDs, which is illustrated in FIG. 6. More specifically, in a given scheduled cell, a UE is not expected to receive a first PDSCH in slot i, with the corresponding HARQ-ACK assigned to be transmitted in slot j, and a second PDSCH starting later than the first PDSCH with its corresponding HARQ-ACK assigned to be transmitted in a slot before slot j. Based on this restriction, the HARQ feedback of a PDSCH (in slot j) cannot be scheduled earlier than the HARQ feedback of a previously transmitted PDSCH (in slot i) with different HARQ process ID.

Existing HARQ procedures in the LTE and NR PHY/MAC have been designed for terrestrial networks where the round-trip time (RTT) propagation delay is no more than 1 ms. With the HARQ protocol, a transmitter needs to wait for the feedback from the receiver before sending new data. In case of a negative acknowledgement (NACK), the transmitter may need to resend the data packet. Otherwise, it may send new data. This stop-and-wait (SAW) procedure introduces latency to the communication protocol, which may reduce the link throughput.

Figure 7:
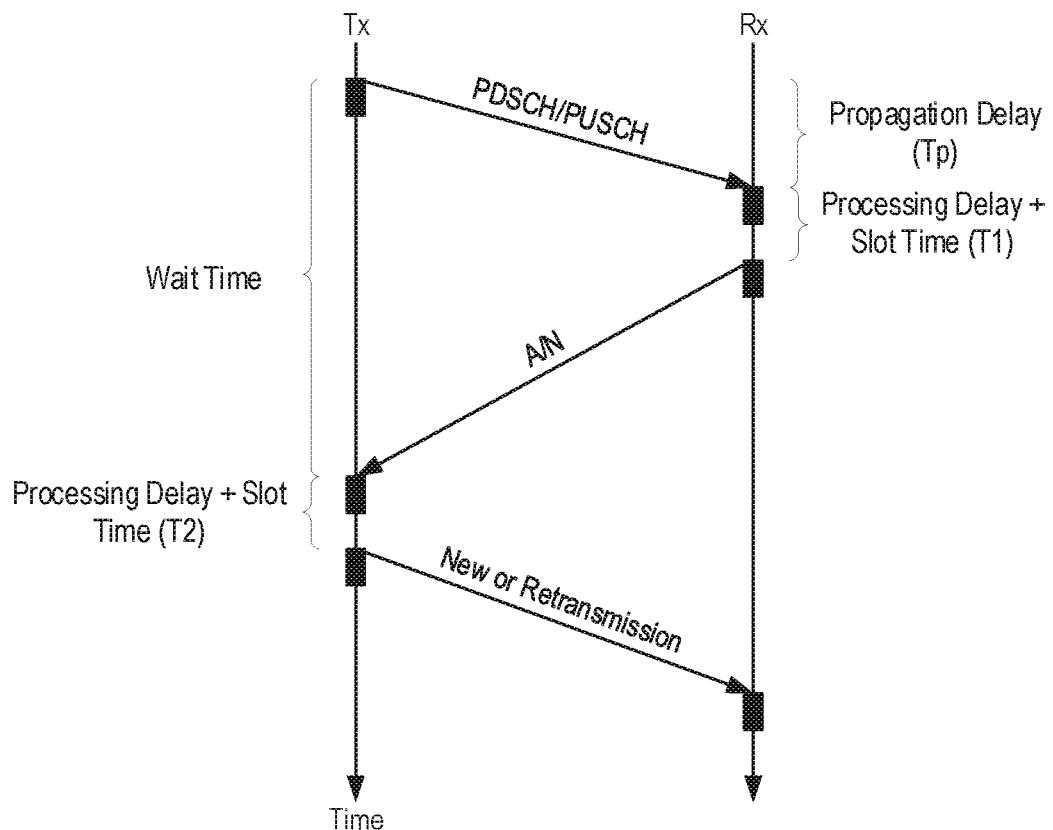
FIG. 7 shows various delays associated with an exemplary HARQ procedure.

FIG. 7 shows various delays associated with an exemplary HARQ procedure. Initially, a transmitter (TX) transmits a data packet on a data channel, e.g., PUSCH for an UL data packet or PDSCH for a DL data packet. The data packet reaches the receiver after a propagation delay Tp, and the receiver sends HARQ feedback after a processing/slot delay T1. The HARQ feedback indicates whether the receiver was successful (ACK) or unsuccessful (NACK) in decoding the data packet. Subsequently, the feedback reaches the data transmitter after another propagation delay Tp. At this point, the transmitter may send a retransmission (in case of NACK) or new data (in case of AC) after a processing/slot delay T2.

To avoid HARQ stalling and reduced link throughput due to these various delays, multiple HARQ processes can be activated at the transmitter and receiver. That is, the transmitter may initiate multiple transmissions in parallel without having to wait for HARQ completion. For example, with 16 HARQ processes in the NR DL, the network (e.g., gNB) may transmit data associated with up to 15 additional HARQ processes while waiting for an ACK for transmitted data associated with a first HARQ process. In terms of the parameters shown in FIG. 7, the minimum required number of HARQ processes is ceil((2Tp+T1+T2)/Ts) where Ts refers to the slot duration in NR or the subframe duration in LTE. Currently, NR allows a maximum number of 16 HARQ processes, which is generally considered sufficient for terrestrial propagation delays that are typically less than 1 ms.

However, the existing HARQ mechanism may not be feasible when the propagation delay is much larger than that supported by the allowed number of HARQ processes. Current LTE and NR technologies were developed for terrestrial cellular networks and adapting them to non-terrestrial networks (NTN) can create various issues, problems, and/or drawbacks for operation of networks and UEs. For example, signal propagation delays in NTNs are typically much longer than in terrestrial wireless networks, which can cause various problems for HARQ operation. These issues are discussed in more detail below.

Figure 8:
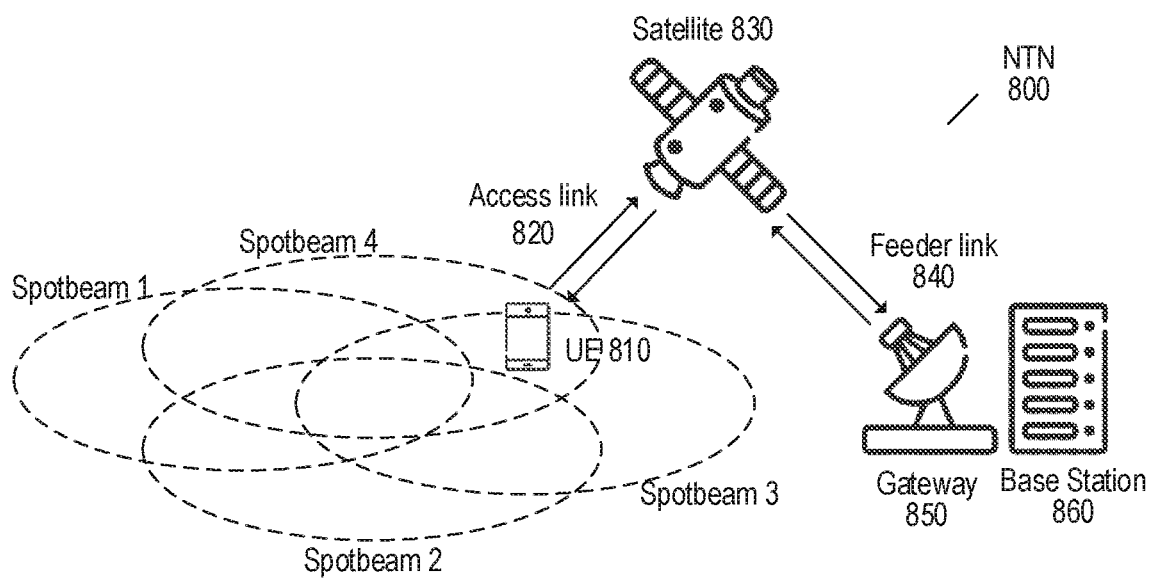
FIG. 8 shows a high-level view of an exemplary satellite radio access network (RAN), which is also referred to as a non-terrestrial network (NTN).

FIG. 8 shows a high-level view of an exemplary satellite radio access network (RAN), which is also referred to as a non-terrestrial network (NTN) 800. The exemplary satellite RAN shown in FIG. 8 includes a space-borne platform, such as a satellite 830, and an earth gateway 850 that connects the satellite to a base station 860. The radio link between the gateway and the satellite is referred to as a "feeder link" (840), while the radio link between the satellite and a particular device (e.g., UE 810) is referred to as an "access link" (820).

Two popular satellite architectures are the bent pipe transponder and the regenerative transponder. In the first case, the base station is located on earth behind the gateway, and the satellite operates as a repeater forwarding the feeder link signal to the service link, and vice versa. In the second case, the satellite includes the base station functionality and the service link connects it to the earth-based core network (e.g., 5GC).

A communication satellite typically generates several beams over a given area. The footprint of a beam (also referred to as "spotbeam") is usually an elliptic shape, which has been traditionally considered as a cell. A spotbeam may move over the earth surface with the satellite movement or may be earth-fixed with some beam pointing mechanism used by the satellite to compensate for its motion. The size of a spotbeam depends on the system design and may range from tens of kilometers to a few thousands of kilometers.

Depending on the orbit altitude, a satellite may be categorized as low earth orbit (LEO), medium earth orbit (MEO), or geostationary earth orbit (GEO). LEO satellites typically have orbital heights of 250-1,500 km (e.g., above earth sea level) and orbital periods of 90-120 minutes. MEO satellites typically have orbital heights of 5,000-25,000 km and orbital periods of 3-15 hours. GEO satellites have orbital heights of approximately 35,786 km and orbital periods of approximately 24 hours. In general, orbital period increases with orbital height.

Consider the scenario where NR DL is used in an NTN. Table 2 below shows the required number of HARQ process to achieve peak throughput and the available percentage of peak throughput for 16 HARQ processes, for each of LEO, MEO, and GEO configurations. As can be seen, without a sufficient number of HARQ processes, the large propagation delays may render closed-loop HARQ communication impractical, particularly for MEO and GEO configurations.

TABLE 2

| Satellite | Total delay | Num. HARQ processes needed to achieve peak throughput | Throughput with 16 HARQ processes (% of peak) |
|---|---|---|---|
| LEO | ~50 ms | ~50 | ~32% |
| MEO | ~180 ms | ~180 | ~8.9% |
| GEO | ~600 ms | ~600 | ~2.7% |

Put differently, the current maximum number of HARQ processes supported by NR is unsuitable for large propagation delays in NTNs. However, there are various problems, issues, and/or difficulties in providing the required of HARQ processes indicated in Table 2, which is proportional to the propagation delay. For example, an increase in the number of HARQ processes requires a corresponding increase in memory, which can be particularly problematic at the UE. Alternately, the HARQ buffer size for each process can be reduced, but this will reduce the maximum transport block size (TBS) that can be supported. Additionally, a large number of HARQ buffers creates a need for a large number of HARQ receivers.

As another example, increasing the number of HARQ processes causes a corresponding increase in the overhead for signaling the HARQ process ID. In NR, the HARQ process ID is indicated by a four-bit field (16 values) in DCI. Increasing the number of HARQ processes to 500 would require around nine bits, more than double the current four bits.

One approach to adapt existing HARQ to NTNs is to enable/disable HARQ feedback, e.g., semi-statically via RRC signaling. For example, the enabling/disabling of HARQ feedback can be configurable both per UE and/or per HARQ process, such that a single UE can be configured with a mixture of enabled and disabled HARQ processes. As a more specific example, a UE can be configured with up to 16 enabled HARQ processes and any number of disabled HARQ processes, such that the total number of HARQ processes can be much more than 16.

In general, HARQ feedback is not transmitted for data messages associated with disabled HARQ processes. In some variants, however, the UE can transmit conventional ACK/NACK feedback for enabled HARQ processes and "dummy" feedback for disabled HARQ processes. For example, the "dummy" feedback can be NACK regardless of success in decoding a corresponding data message.

As a more specific example, such "dummy" feedback can be used in conjunction with a type-1 codebook, which has semi-static codebook size determined via RRC configuration. The use of enabled/disabled HARQ process is determined based on the HARQ process ID field in the DCI. If the feedback is dependent on DCI, the size of type 1 codebook would dynamically vary over time, which would go against the original design purpose (i.e., semi-static) of type 1 codebook. An alternative would be to insert dummy feedback in the entries of the type 1 codebook that correspond to the disabled HARQ processes.

Although disabling HARQ feedback can mitigate the effect of the long propagation delay on data throughput, it can adversely affect various timing of the scheduling and/or processing that are defined in relation to the HARQ-ACK feedback by the 3GPP specifications. As a more specific example, disabling a HARQ process can affect the required UE processing time for consecutive PDSCH/PUSCH transmissions, which are associated with the out-of-order scheduling restriction discussed above. In particular, there is no defined way for a UE to treat the out-of-order scheduling restriction when it relates to one or more HARQ processes that are disabled.

Accordingly, exemplary embodiments of the present disclosure provide flexible and efficient techniques that address scheduling restrictions for PDSCH and corresponding HARQ when one or more of a UE's HARQ processes are disabled. Such techniques can include interpreting DCI and/or other fields that schedule HARQ feedback in novel and/or unique ways when HARQ feedback is disabled for a HARQ process. Such interpretations can fill gaps where 3GPP specifications don't address UE and/or network behavior when HARQ processes are disabled, thereby facilitating correct operation of UE and network. Other advantages include facilitating sufficient processing time for UE reception of data messages (e.g., PDSCH) associated with different HARQ processes, as well as facilitating flexibility in network scheduling and/or UE transmission of HARQ feedback when at least one of the UE's HARQ processes are disabled.

Other advantages and/or benefits can be specific to particular embodiments. For example, current UE implementation takes advantage of the out-of-order scheduling restriction when processing multiple PDSCH. If the out-of-order restriction does not apply to disabled HARQ processes, there would be additional scheduling flexibility for the network side but at the cost of reduced UE processing time, which could possibly impact UE complexity and cost. Accordingly, maintaining the out-of-order scheduling restriction based on virtual feedback for disabled HARQ processes can reduce UE complexity and cost, and/or lead to earlier introduction of such features in UEs.

Various embodiments are described below in the context of an out-of-order scheduling restriction as applied to first and second HARQ processes, at least one of which is disabled. Specific cases include the following, which are labeled as "groups" for the purpose of facilitating explanation:

First group: scheduling of a first PDSCH with disabled HARQ process followed by a second PDSCH with enabled HARQ process.

Second group: scheduling of a first PDSCH with enabled HARQ process followed by a second PDSCH with disabled HARQ process.

Third group: scheduling of a first PDSCH with disabled HARQ process followed by a second PDSCH with disabled HARQ process.

In the following description, n refers to a slot in which a PDSCH reception ends and n+k refers to the slot in which the UE would report HARQ feedback. This can also be referred to as "restriction of reporting HARQ feedback at slot n+k." Examples of k include:

K1, the number of slots indicated by the PDSCH-to-HARQ_feedback timing indicator field in a corresponding DCI format; and dl-DataToUL-ACK previously configured via RRC, if the PDSCH-to-HARQ_feedback timing indicator field is not present in the DCI format.

In the following description, the phrase "the UE would report HARQ feedback at slot n+k" may refer to the scenario where the UE reports HARQ feedback for an enabled HARQ process but may refrain from reporting HARQ feedback for a disabled HARQ process.

In some embodiments of the first group, when a first PDSCH associated with a disabled HARQ process is followed by a second PDSCH associated with an enabled HARQ process, the out-of-order scheduling restriction does not apply.

In one variant, the restriction of reporting HARQ-ACK at slot n+k does not apply to the first PDSCH with disabled HARQ process. In this variant, either k is not signaled or k is signaled but the signaled value does not carry any meaning. As one example of the latter option, the PDSCH-to-HARQ_feedback timing indicator field (K1) in a corresponding DCI format can be considered as reserved or used to carry other information, such that the UE does not interpret the field as the value of k.

In another variant, the restriction of reporting HARQ-ACK at slot n+k is still applicable to the first PDSCH with disabled HARQ process, despite that the UE may or may not send HARQ-ACK feedback for the disabled HARQ process.

Figure 9:
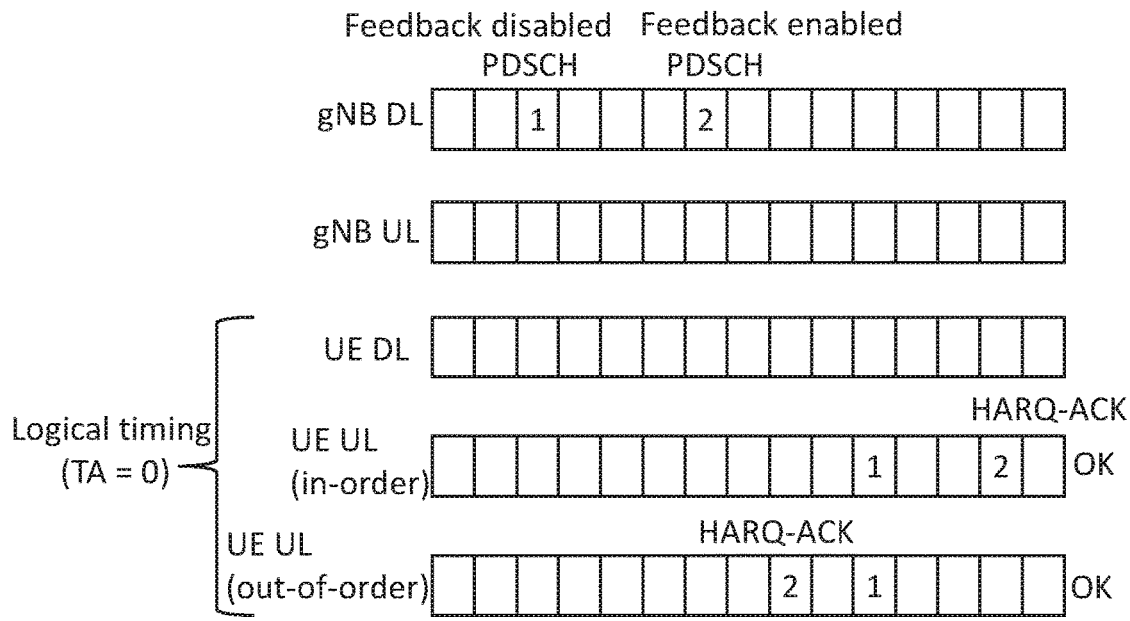
FIGS. 9-14 show timing diagrams of PDSCH transmissions and corresponding HARQ feedback, according to various exemplary embodiments of the present disclosure.

In either of the above variants, the HARQ feedback slot for the second PDSCH associated with the enabled HARQ process is not restricted by the scheduling of the first PDSCH associated with the disabled HARQ process. That is, the HARQ feedback of the enabled HARQ process can be sent before the HARQ feedback slot of the disabled HARQ process, which can be referred to as a "virtual HARQ feedback" or "virtual HARQ feedback slot" since HARQ feedback may not be actually transmitted for the disabled HARQ process. This is illustrated by FIG. 9, where the timing of HARQ feedback for PDSCH2 (with enabled HARQ feedback) is not limited by the virtual HARQ feedback slot of PDSCH1 (with disabled HARQ process).

In other embodiments of the first group, when a first PDSCH associated with a disabled HARQ process is followed by a second PDSCH associated with an enabled HARQ process, the out-of-order scheduling restriction applies (as customary), although HARQ feedback may not actually be sent for the first PDSCH associated with the disabled HARQ process. These embodiments can be viewed as a virtual HARQ feedback slot for the disabled HARQ based on the K1 value and the out-of-order restriction being applicable to enabled and disabled HARQ processes.

For example, when a first PDSCH associated with a disabled HARQ process is followed by a second PDSCH associated with a enabled HARQ process, K1 still indicates a timing relation between the first PDSCH and corresponding HARQ feedback, even though HARQ feedback for the first PDSCH may not actually be transmitted. Recall that K1 is provided either by the PDSCH-to-HARQ feedback timing indicator field in the DCI scheduling the first PDSCH with disabled HARQ process, or by RRC parameter dl-DataToUL-ACK if the PDSCH-to-HARQ_feedback timing indicator field is not present in the DCI format used. Assuming that reception of first PDSCH with disabled HARQ process ends at slot n, the virtual HARQ feedback slot for the first PDSCH with disabled HARQ process can be determined as slot n+k, where k is the indicated K1 value. The UE does not expect to transmit the HARQ feedback for the second PDSCH with enabled HARQ process before the slot n+k.

Figure 10:
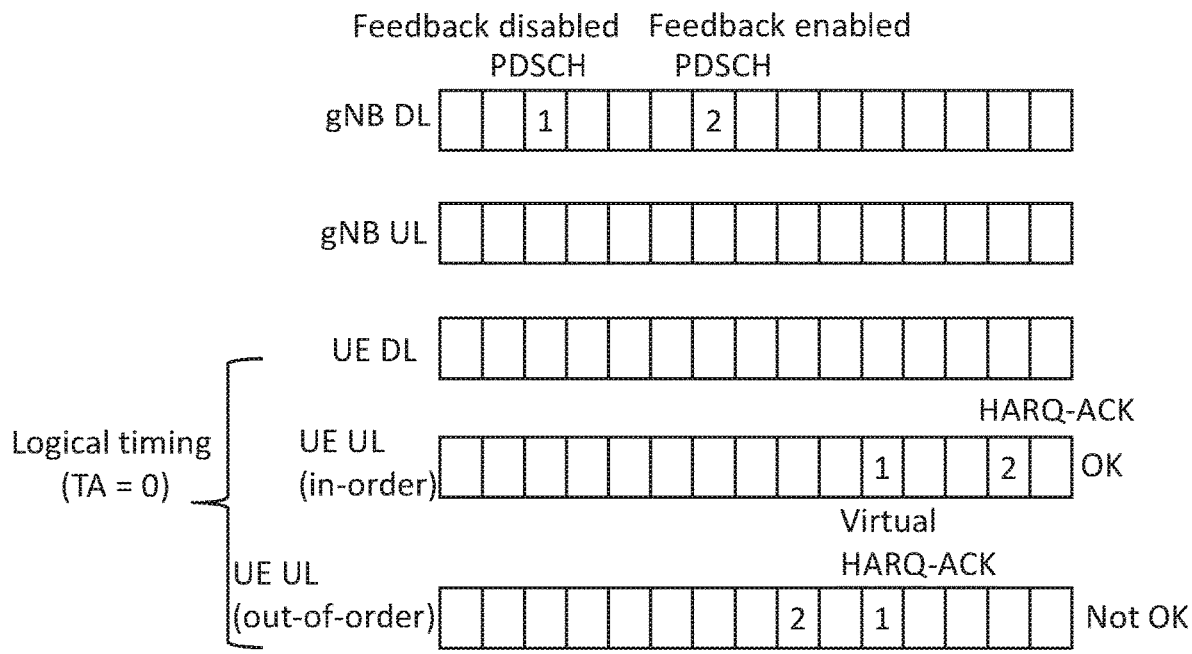

FIG. 10 illustrates these embodiments of the first group. In particular, the timing of HARQ feedback for PDSCH2 (with enabled HARQ feedback) is limited by the virtual HARQ feedback slot for PDSCH1 (with disabled HARQ process), such that the scheduling of HARQ feedback for PDSCH2 must be no earlier than the virtual HARQ feedback slot for PDSCH1.

In a variant of the embodiments illustrated by FIG. 10 (in which the out-of-order restriction applies), the PDSCH-to-HARQ feedback timing indicator field in a corresponding DCI format is reserved for disabled HARQ processes. In this case, a nominal K1 value is used to determine slot n+k for the HARQ feedback for PDSCH associated with a disabled HARQ process, although the UE may or may not actually transmit HARQ in slot n+k. Examples of a nominal K1 value include:

A predetermined value, e.g., fixed by 3GPP specification.
A new RRC parameter configuring the nominal K1 value.
A value derived from an existing RRC parameter, e.g., the minimum of the list of K1 values configured by the RRC parameter dl-DataToUL-ACK.

Depending on UE capability, different UEs may have different nominal K1 values.

Assume that a first PDSCH reception of a HARQ disabled process ends in slot n. The virtual HARQ feedback slot for the first PDSCH of the disabled HARQ process is determined as slot n+k, where k is equal to the nominal K1 value. In such case, the UE is not expected to be scheduled with the HARQ feedback for a second PDSCH of an enabled HARQ process to be transmitted before slot n+k.

In some embodiments of the second group, when a first PDSCH associated with an enabled HARQ process is followed by a second PDSCH associated with a disabled HARQ process, the out-of-order scheduling restriction does not apply.

In one variant, the restriction of reporting HARQ-ACK at slot n+k does not apply to the second PDSCH with disabled HARQ process. In this variant, either k is not signaled or k is signaled but the signaled value does not carry any meaning. As one example of the latter option, the PDSCH-to-HARQ_feedback timing indicator field (K1) in a corresponding DCI format can be considered as reserved or used to carry other information, such that the UE does not interpret the field as the value of k.

In another variant, the restriction of reporting HARQ-ACK at slot n+k is still applicable to the second PDSCH associated with the disabled HARQ process, despite that the UE may or may not send HARQ-ACK feedback for the disabled HARQ process.

Figure 11:
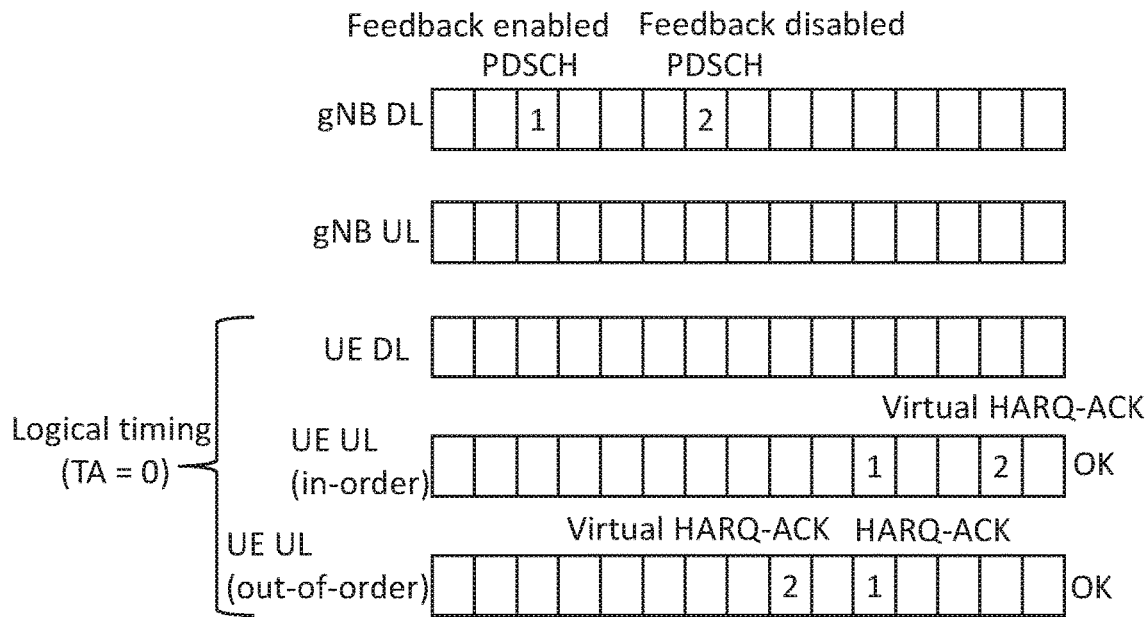

In either of the above variants, the HARQ feedback slot for the second PDSCH associated with the disabled HARQ process is not restricted by the scheduling of the first PDSCH associated the with enabled HARQ process. That is, the virtual HARQ feedback slot of the disabled HARQ process can be before the HARQ feedback slot of the enabled HARQ process. This is illustrated by FIG. 11, where the timing of virtual HARQ feedback slot for PDSCH2 (with disabled HARQ feedback) is not limited by the timing of the HARQ feedback for PDSCH1 (with enabled HARQ process).

In other embodiments of the second group, when a first PDSCH associated with an enabled HARQ process is followed by a second PDSCH associated with a disabled HARQ process, the out-of-order scheduling restriction applies (as customary), although HARQ feedback may not actually be sent for the second PDSCH associated with the disabled HARQ process. These embodiments can be viewed as a virtual HARQ feedback slot for the disabled HARQ process based on the K1 value and the out-of-order restriction being applicable to enabled and disabled HARQ processes.

For example, when a first PDSCH associated with an enabled HARQ process is followed by a second PDSCH associated with a disabled HARQ process, K1 (via DCI or RRC, as discussed above) still indicates a timing relation between the second PDSCH and corresponding HARQ feedback, even though HARQ feedback for the second PDSCH may not actually be transmitted. Assuming that reception of second PDSCH with disabled HARQ process ends at slot n, the virtual HARQ feedback slot for the second PDSCH with disabled HARQ process can be determined as slot n+k, where k is the indicated K1 value. The UE does not expect that slot n+k will be before the HARQ feedback for the first PDSCH associated with the enabled HARQ process.

Figure 12:
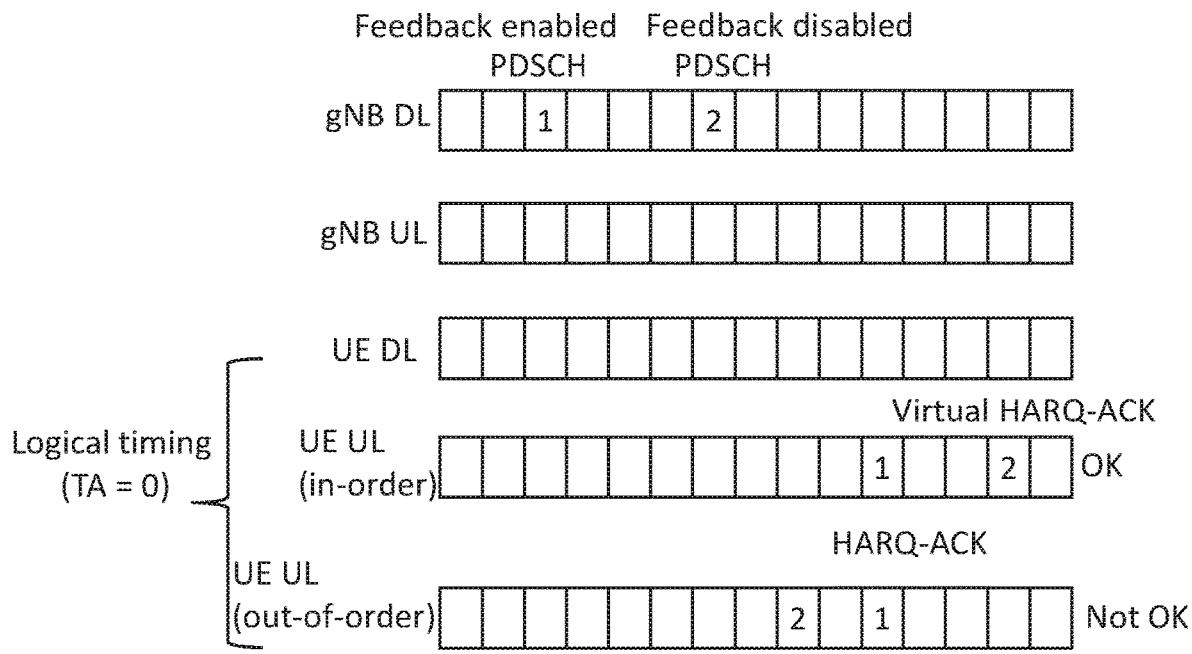

FIG. 12 illustrates these embodiments of the second group. In particular, the timing of virtual HARQ feedback for PDSCH2 (with disabled HARQ feedback) is limited by the HARQ feedback slot for PDSCH1 (with enabled HARQ process), such that the scheduling of virtual HARQ feedback for PDSCH2 must be no earlier than the HARQ feedback slot for PDSCH1.

In a variant of the embodiments illustrated by FIG. 12 (in which the out-of-order restriction applies), the PDSCH-to-HARQ feedback timing indicator field in a corresponding DCI format is reserved for disabled HARQ processes. In this case, a nominal K1 value is used to determine slot n+k for the HARQ feedback for PDSCH associated with a disabled HARQ process, although the UE may or may not actually transmit HARQ in slot n+k. The nominal value used for embodiments of the second group can have any of the same characteristics as a nominal value used for embodiments of the first group, discussed above.

Assume that a second PDSCH reception of the disabled HARQ process ends in slot n. The virtual HARQ feedback slot for the second PDSCH of the disabled HARQ process is determined as slot n+k, where k is equal to the nominal K1 value. In such case, the UE does not expect slot n+k.to be before the HARQ feedback slot for the first PDSCH associated with the enabled HARQ process.

In some embodiments of the third group, when a first PDSCH associated with a disabled HARQ process is followed by a second PDSCH associated with a disabled HARQ process, the out-of-order scheduling restriction does not apply.

In one variant, the restriction of reporting HARQ-ACK at slot n+k does not apply to the first PDSCH or the second PDSCH associated with disabled HARQ processes. In this variant, either k is not signaled or k is signaled but the signaled value does not carry any meaning. As one example of the latter option, the PDSCH-to-HARQ_feedback timing indicator field (K1) in a corresponding DCI format can be considered as reserved or used to carry other information, such that the UE does not interpret the field as the value of k.

In another variant, the restriction of reporting HARQ-ACK at slot n+k is still applicable to the first PDSCH and the second PDSCH associated with disabled HARQ processes, despite that the UE may or may not send HARQ-ACK feedback for the disabled HARQ processes.

Figure 13:
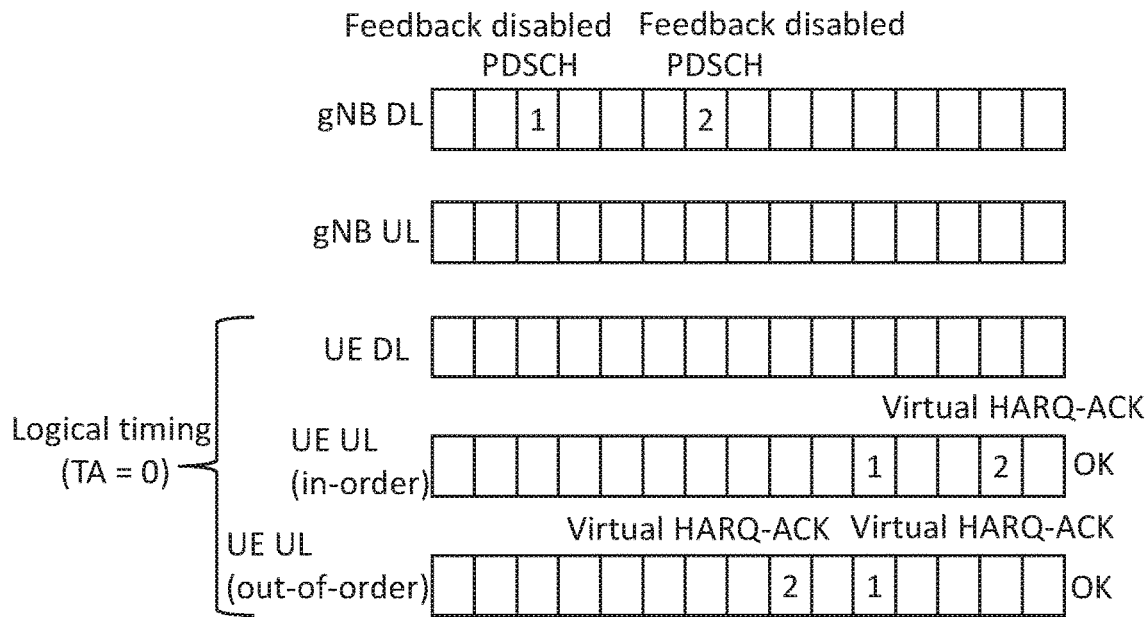

In either of the above variants, the virtual HARQ feedback slot for the second PDSCH associated with the disabled HARQ process is not restricted by the scheduling of the first PDSCH associated with the disabled HARQ process. That is, the virtual HARQ feedback slot of the disabled HARQ process can be before the HARQ feedback slot of the enabled HARQ process. This is illustrated by FIG. 13, where the timing of virtual HARQ feedback slot for PDSCH2 (with disabled HARQ feedback) is not limited by the timing of the virtual HARQ feedback for PDSCH1 (with disabled HARQ process).

In other embodiments of the third group, when a first PDSCH associated with a disabled HARQ process is followed by a second PDSCH associated with a disabled HARQ process, the out-of-order scheduling restriction applies (as customary), although HARQ feedback may not actually be sent for either or both of the first and second PDSCHs associated with the disabled HARQ processes. These embodiments can be viewed as a virtual HARQ feedback slot for the disabled HARQ process based on the K1 value and the out-of-order restriction being applicable to enabled and disabled HARQ processes.

For example, when a first PDSCH associated with a disabled HARQ process is followed by a second PDSCH associated with a disabled HARQ process, K1 (via DCI or RRC, as discussed above) still indicates a timing relation between PDSCH and corresponding HARQ feedback, even though HARQ feedback for the first and/or second PDSCH may not actually be transmitted. Assuming that reception of second PDSCH with disabled HARQ process ends at slot n, the virtual HARQ feedback slot for the second PDSCH with disabled HARQ process can be determined as slot n+k, where k is the indicated K1 value. The UE does not expect that slot n+k will be before the virtual HARQ feedback slot for the first PDSCH associated with the disabled HARQ process.

Figure 14:
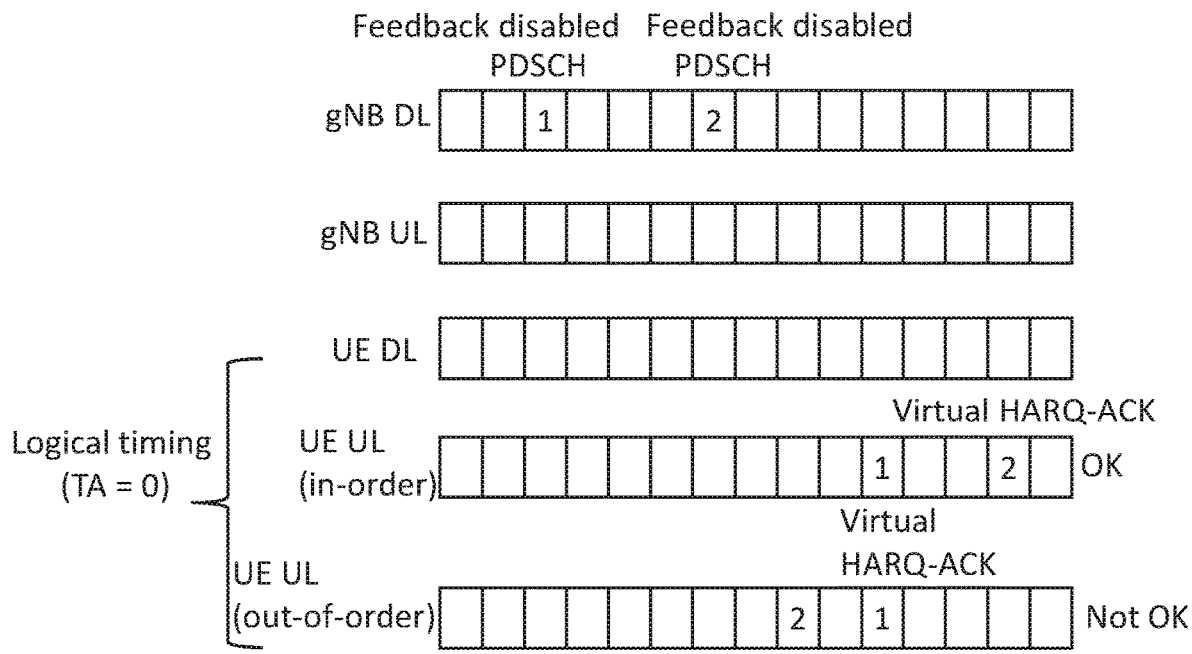

FIG. 14 illustrates these embodiments of the second group. In particular, the timing of virtual HARQ feedback for PDSCH2 (with disabled HARQ feedback) is limited by the virtual HARQ feedback slot for PDSCH1 (with disabled HARQ process), such that the scheduling of virtual HARQ feedback for PDSCH2 must be no earlier than the virtual HARQ feedback slot for PDSCH1.

In a variant of the embodiments illustrated by FIG. 14 (in which the out-of-order restriction applies), the PDSCH-to-HARQ feedback timing indicator field in a corresponding DCI format is reserved for disabled HARQ processes. In this case, a nominal K1 value is used to determine slot n+k for the HARQ feedback for PDSCH associated with a disabled HARQ process, although the UE may or may not actually transmit HARQ in slot n+k. The nominal value used for embodiments of the third group can have any of the same characteristics as a nominal value used for embodiments of the first group, discussed above.

Assume that a second PDSCH reception of the disabled HARQ process ends in slot n. The virtual HARQ feedback slot for the second PDSCH of the disabled HARQ process is determined as slot n+k, where k is equal to the nominal K1 value. In such case, the UE does not expect slot n+k to be before the HARQ feedback slot for the first PDSCH associated with the enabled HARQ process.

Figure 15:
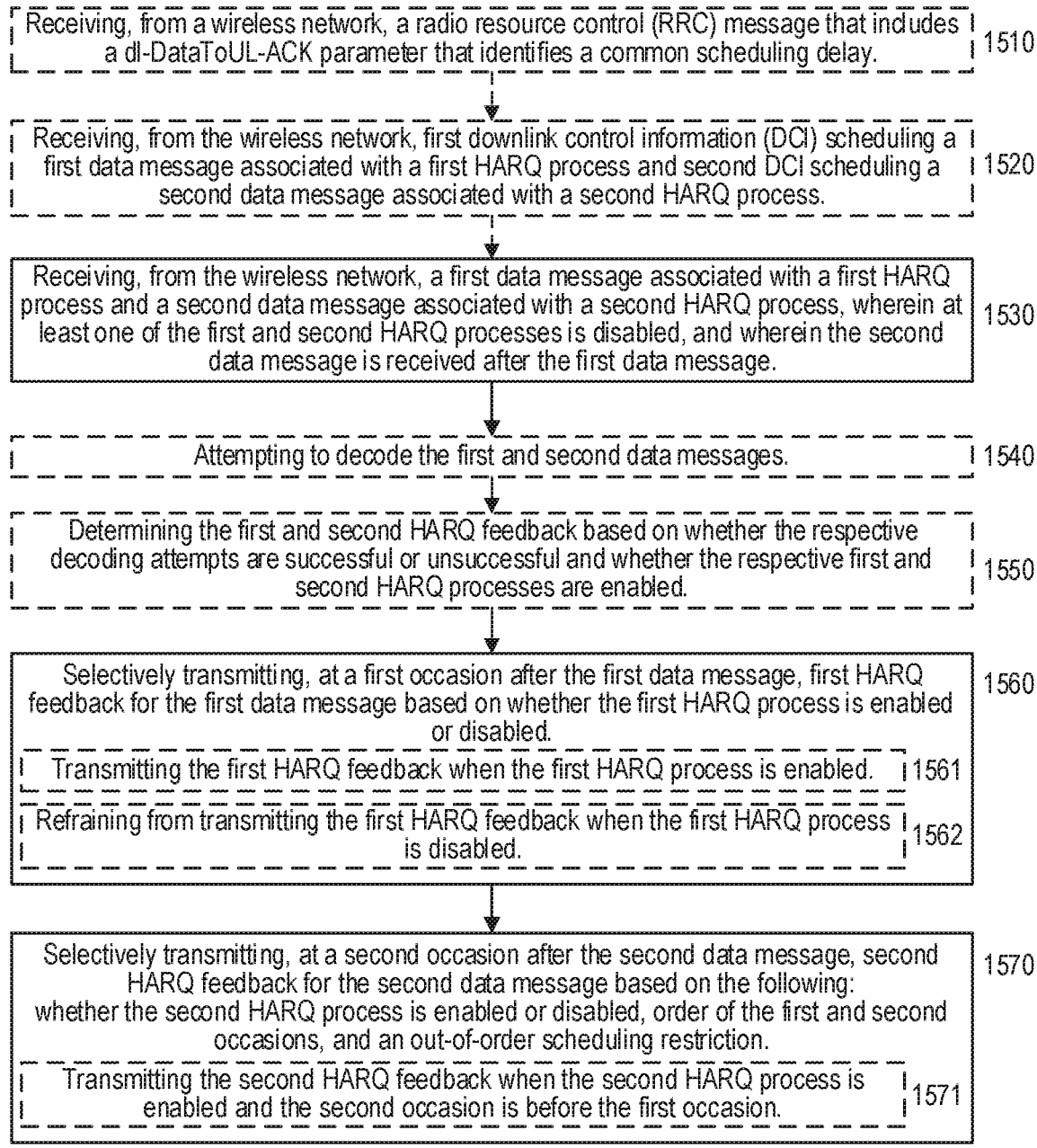
FIG. 15 shows a flow diagram of an exemplary method for a UE (e.g., wireless device), according to various exemplary embodiments of the present disclosure.
Figure 16:
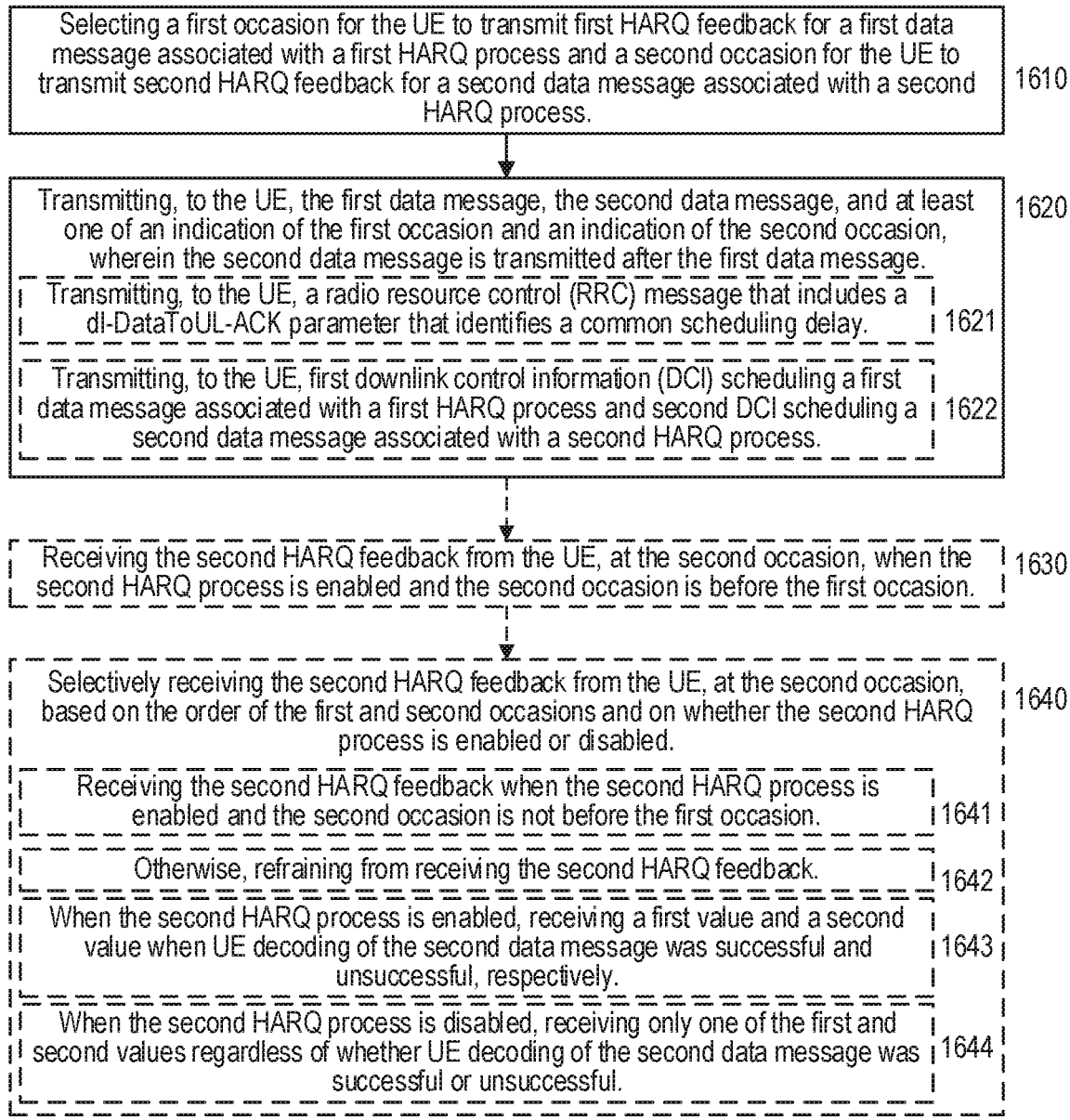
FIG. 16 shows a flow diagram of an exemplary method for a network node (e.g., base station, eNB, gNB, ng-eNB, etc.) of a wireless network (e.g., NG-RAN, E-UTRAN), according to various exemplary embodiments of the present disclosure.

Various features of the embodiments described above correspond to various operations illustrated in FIGS. 15-16, which show exemplary methods (e.g., procedures) for a UE and a network node, respectively. In other words, various features of the operations described below correspond to various embodiments described above. Furthermore, the exemplary methods shown in FIGS. 15-16 can be used cooperatively to provide various benefits, advantages, and/or solutions to problems described herein. Although FIGS. 15-16 show specific blocks in particular orders, the operations of the exemplary methods can be performed in different orders than shown and can be combined and/or divided into blocks having different functionality than shown. Optional blocks or operations are indicated by dashed lines.

In particular, FIG. 15 shows an exemplary method (e.g., procedure) for a user equipment (UE) to transmit hybrid ARQ (HARQ) feedback for data transmissions from a wireless network, according to various exemplary embodiments of the present disclosure. The exemplary method can be performed by a UE (e.g., wireless device, IoT device, etc.) configured according to other figures described herein. In some embodiments, the wireless network can be a non-terrestrial network (NTN), such as described elsewhere herein.

The exemplary method can include the operations of block 1530, where the UE can receive, from the wireless network, a first data message associated with a first HARQ process and a second data message associated with a second HARQ process. At least one of the first and second HARQ processes is disabled, and the second data message is received after the first data message. The exemplary method can also include the operations of block 1560, where the UE can selectively transmit, at a first occasion after the first data message, first HARQ feedback for the first data message based on whether the first HARQ process is enabled or disabled. The exemplary method can also include the operations of block 1570, where the UE can selectively transmit, at a second occasion after the second data message, second HARQ feedback for the second data message based on the following: whether the second HARQ process is enabled or disabled, order of the first and second occasions, and an out-of-order scheduling restriction.

In some embodiments, the first and second data messages are first and second physical downlink shared channels (PDSCHs). In such embodiments, the out-of-order scheduling restriction comprises the UE is not expected to receive the first PDSCH in slot i, with the first HARQ feedback assigned to be transmitted in slot j, and the second PDSCH starting later than the first PDSCH with the second HARQ feedback assigned to be transmitted in a slot before slot j.

In some embodiments, the selectively transmitting operations of block 1560 can include the operations of sub-blocks 1561-1562, where the UE can transmit the first HARQ feedback when the first HARQ process is enabled (sub-block 1541), and refrain from transmitting the first HARQ feedback when the first HARQ process is disabled (sub-block 1542).

In some embodiments, the exemplary method can also include the operations of blocks 1540-1550, where the UE can attempt to decode the first and second data messages and determine the first and second HARQ feedback based on whether the respective decoding attempts are successful or unsuccessful and whether the respective first and second HARQ processes are enabled. In some of these embodiments, each of the first and second HARQ feedback can be determined as:
  a first value (e.g., ACK) or a second value (e.g., NACK) based on whether the decoding attempt for the corresponding data message is successful or unsuccessful, respectively, when the corresponding HARQ process is enabled; and
  only one of the first and second values (e.g., ACK or NACK) regardless of whether the decoding attempt for the corresponding data message is successful or unsuccessful, when the corresponding HARQ process is disabled.

The latter case is an example of "dummy" HARQ feedback discussed elsewhere herein.

In some embodiments, the out-of-order scheduling restriction does not apply to the first and second data messages, such that selectively transmitting the second HARQ feedback (e.g., in block 1570) is not based on the order of the first and second occasions. In such case, the selectively transmitting operations in block 1570 can include the operations of sub-block 1571, where the UE can transmit the second HARQ feedback when the second HARQ process is enabled and the second occasion is before the first occasion. As discussed above, this operation would be prohibited and/or would not occur if the out-of-order scheduling restriction applies.

In other embodiments, the out-of-order scheduling restriction applies to the first and second data messages. In such case, when the second occasion is not before the first occasion, the second HARQ feedback is selectively transmitted based on whether the second HARQ process is enabled or disabled. Likewise, when the second occasion is before the first occasion, the second HARQ feedback is not transmitted.

In some embodiments, the exemplary method can also include the operations of block 1520, where the UE can receive the following from the wireless network: first downlink control information (DCI) scheduling the first data message associated with the first HARQ process, and second DCI scheduling the second data message associated with the second HARQ process. Each of the first and second DCIs includes a first field that indicates a HARQ process and a second field arranged to indicate an occasion for the UE to transmit HARQ feedback for a data message associated with the HARQ process indicated by the first field.

In some of these embodiments, the out-of-order scheduling restriction does not apply to the first and second data messages and the second field of each DCI indicates an occasion for the UE to transmit HARQ feedback only when the HARQ process indicated by the first field is enabled. On the other hand, when the HARQ process indicated by the first field is disabled, the occasion for the UE to transmit HARQ feedback is indicated by one of the following:
  a predetermined value known by both the UE and the wireless network; or
  one of the following configured by a radio resource control (RRC) message previously transmitted to the UE: a predetermined value, or a predetermined one of a plurality of values.

In other of these embodiments, the out-of-order scheduling restriction applies to the first and second data messages and the second field of each DCI indicates an occasion for the UE to transmit HARQ feedback.

In other embodiments, the exemplary method can also include the operations of block 1510, where the UE can receive, from the wireless network, a radio resource control (RRC) message that includes a dl-DataToUL-ACK parameter that identifies a common scheduling delay. When the out-of-order scheduling restriction does not apply to the first and second data messages, the common scheduling delay indicates the first and second occasions only when the respective first and second HARQ processes are enabled. But when the out-of-order scheduling restriction applies to the first and second data messages, the common scheduling delay indicates the first and second occasions (i.e., regardless of whether the processes are enabled/disabled).

In addition, FIG. 16 shows an exemplary method (e.g., procedure) for a network node in a wireless network, to receive HARQ feedback from a UE for data transmissions by the network node, according to various exemplary embodiments of the present disclosure. The exemplary method can be performed by a network node (e.g., base station, eNB, gNB, ng-eNB, gateway satellite, etc., or component thereof) in a wireless network (e.g., E-UTRAN, NG-RAN), such as described elsewhere herein. In some embodiments, the wireless network can be a non-terrestrial network (NTN), such as described elsewhere herein.

The exemplary method can include the operations of block 1610, where the network node can select a first occasion for the UE to transmit first HARQ feedback for a first data message associated with a first HARQ process and a second occasion for the UE to transmit second HARQ feedback for a second data message associated with a second HARQ process. The selecting is based on:
  whether each of the first and second HARQ processes is enabled or disabled, with at least one being disabled, and
  an out-of-order scheduling restriction.

The exemplary method can also include the operations of block 1620, where the network node can transmit, to the UE, the first data message, the second data message, and at least one of an indication of the first occasion and an indication of the second occasion. The second data message is transmitted after the first data message.

In some embodiments, the first and second data messages are first and second physical downlink shared channels (PDSCHs). In such embodiments, the out-of-order scheduling restriction comprises the UE is not expected to receive the first PDSCH in slot i, with the first HARQ feedback assigned to be transmitted in slot j, and the second PDSCH starting later than the first PDSCH with the second HARQ feedback assigned to be transmitted in a slot before slot j.

In some embodiments, the out-of-order scheduling restriction does not apply to the first and second data messages, such that when the first HARQ process is disabled, the second occasion can be selected to be before or not before the first occasion. In such embodiments, the exemplary method can also include operations where the network node can receive the second HARQ feedback from the UE, at the second occasion, when the second HARQ process is enabled and the second occasion is before the first occasion. As discussed above, this operation would be prohibited and/or would not occur if the out-of-order scheduling restriction applies.

In other embodiments, the out-of-order scheduling restriction applies to the first and second data messages. In such embodiments, the exemplary method can also include the operations of block 1640, where the network node can selectively receive the second HARQ feedback from the UE, at the second occasion, based on the order of the first and second occasions and on whether the second HARQ process is enabled or disabled.

In some of these embodiments, the selectively receiving operations of block 1640 can include the operations of sub-blocks 1641-1642, where the network node can receive the second HARQ feedback when the second HARQ process is enabled and the second occasion is not before the first occasion (sub-block 1641) but otherwise, refrain from receiving the second HARQ feedback (sub-block 1642).

In other of these embodiments, the selectively receiving operations of block 1640 can include the operations of sub-blocks 1643-1644. In sub-block 1643, when the second HARQ process is enabled, the network node can receive a first value (e.g., ACK) and a second value (e.g., NACK) when UE decoding of the second data message was successful and unsuccessful, respectively. In sub-block 1644, when the second HARQ process is disabled, the network node can receive only one of the first and second values (e.g., ACK or NACK) regardless of whether UE decoding of the second data message was successful or unsuccessful. Sub-block 1644 is an example of "dummy" HARQ feedback discussed elsewhere herein.

In some embodiments, the transmitting operations of block 1620 can include the operations of sub-block 1622, where the network node can transmit the following to the UE: first downlink control information (DCI) scheduling the first data message associated with the first HARQ process, and second DCI scheduling the second data message associated with the second HARQ process. Each of the first and second DCIs includes a first field that indicates a HARQ process and a second field arranged to indicate an occasion for the UE to transmit HARQ feedback for a data message associated with the HARQ process indicated by the first field.

In some of these embodiments, the out-of-order scheduling restriction does not apply to the first and second data messages and the second field of each DCI indicates an occasion (e.g., first occasion or second occasion) for the UE to transmit HARQ feedback only when the HARQ process indicated by the first field is enabled. On the other hand, when the HARQ process indicated by the first field is disabled, the occasion for the UE to transmit HARQ feedback is indicated by one of the following:
 a predetermined value known by both the UE and the wireless network; or
 one of the following configured by a radio resource control (RRC) message previously transmitted to the UE: a predetermined value, or a predetermined one of a plurality of values.

In other of these embodiments, the out-of-order scheduling restriction applies to the first and second data messages and the second field of each DCI indicates an occasion (e.g., first occasion or second occasion) for the UE to transmit HARQ feedback.

In other embodiments, the transmitting operations of block 1620 can include the operations of sub-block 1621, where the network node can transmit, to the UE, a radio resource control (RRC) message that includes a dl-DataToUL-ACK parameter that identifies a common scheduling delay. When the out-of-order scheduling restriction does not apply to the first and second data messages, the common scheduling delay indicates the first and second occasions only when the respective first and second HARQ processes are enabled. But when the out-of-order scheduling restriction applies to the first and second data messages, the common scheduling delay indicates the first and second occasions (i.e., regardless of whether the processes are enabled/disabled).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 17:
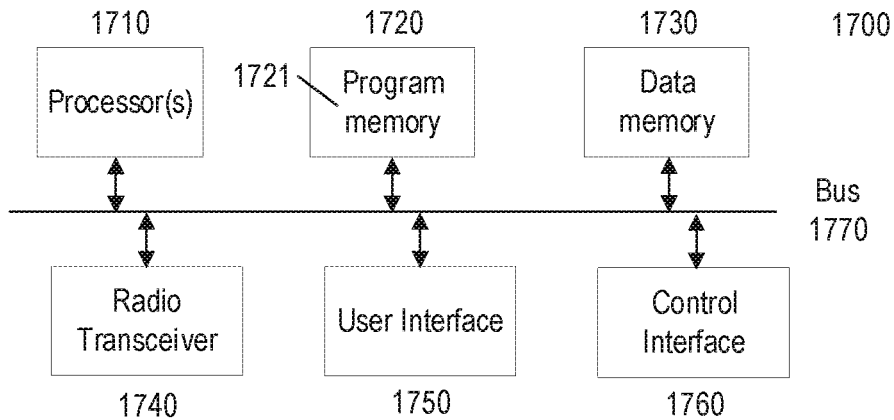
FIG. 17 shows a block diagram of an exemplary wireless device or UE, according to various exemplary embodiments of the present disclosure.

FIG. 17 shows a block diagram of an exemplary wireless device or user equipment (UE) 1700 (hereinafter referred to as "UE 1700") according to various embodiments of the present disclosure, including those described above with reference to other figures. For example, UE 1700 can be configured by execution of instructions, stored on a computer-readable medium, to perform operations corresponding to one or more of the exemplary methods described herein.

UE 1700 can include a processor 1710 (also referred to as "processing circuitry") that can be operably connected to a program memory 1720 and/or a data memory 1730 via a bus 1770 that can comprise parallel address and data buses, serial ports, or other methods and/or structures known to those of ordinary skill in the art. Program memory 1720 can store software code, programs, and/or instructions (collectively shown as computer program product 1721 in FIG. 17) that, when executed by processor 1710, can configure and/or facilitate UE 1700 to perform various operations, including operations corresponding to various exemplary methods described herein. As part of or in addition to such operations, execution of such instructions can configure and/or facilitate UE 1700 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1740, user interface 1750, and/or control interface 1760.

As another example, processor 1710 can execute program code stored in program memory 1720 that corresponds to MAC, RLC, PDCP, SDAP, RRC, and NAS layer protocols standardized by 3GPP (e.g., for NR and/or LTE). As a further example, processor 1710 can execute program code stored in program memory 1720 that, together with radio transceiver 1740, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1710 can execute program code stored in program memory 1720 that, together with radio transceiver 1740, implements device-to-device (D2D) communications with other compatible devices and/or UEs.

Program memory 1720 can also include software code executed by processor 1710 to control the functions of UE 1700, including configuring and controlling various components such as radio transceiver 1740, user interface 1750, and/or control interface 1760. Program memory 1720 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1720 can comprise an external storage arrangement (not shown) remote from UE 1700, from which the instructions can be downloaded into program memory 1720 located within or removably coupled to UE 1700, so as to enable execution of such instructions.

Data memory 1730 can include memory area for processor 1710 to store variables used in protocols, configuration, control, and other functions of UE 1700, including operations corresponding to, or comprising, any of the exemplary methods described herein. Moreover, program memory 1720 and/or data memory 1730 can include non-volatile memory (e.g., flash memory), volatile memory (e.g., static or dynamic RAM), or a combination thereof. Furthermore, data memory 1730 can comprise a memory slot by which removable memory cards in one or more formats (e.g., SD Card, Memory Stick, Compact Flash, etc.) can be inserted and removed.

Persons of ordinary skill will recognize that processor 1710 can include multiple individual processors (including, e.g., multi-core processors), each of which implements a portion of the functionality described above. In such cases, multiple individual processors can be commonly connected to program memory 1720 and data memory 1730 or individually connected to multiple individual program memories and or data memories. More generally, persons of ordinary skill in the art will recognize that various protocols and other functions of UE 1700 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1740 can include radio-frequency transmitter and/or receiver functionality that facilitates the UE 1700 to communicate with other equipment supporting like wireless communication standards and/or protocols. In some exemplary embodiments, the radio transceiver 1740 includes one or more transmitters and one or more receivers that enable UE 1700 to communicate according to various protocols and/or methods proposed for standardization by 3GPP and/or other standards bodies. For example, such functionality can operate cooperatively with processor 1710 to implement a PHY layer based on OFDM, OFDMA, and/or SC-FDMA technologies, such as described herein with respect to other figures.

In some exemplary embodiments, radio transceiver 1740 includes one or more transmitters and one or more receivers that can facilitate the UE 1700 to communicate with various LTE, LTE-Advanced (LTE-A), and/or NR networks according to standards promulgated by 3GPP. In some exemplary embodiments of the present disclosure, the radio transceiver 1740 includes circuitry, firmware, etc. necessary for the UE 1700 to communicate with various NR, NR-U, LTE, LTE-A, LTE-LAA, UMTS, and/or GSM/EDGE networks, also according to 3GPP standards. In some embodiments, radio transceiver 1740 can include circuitry supporting D2D communications between UE 1700 and other compatible devices.

In some embodiments, radio transceiver 1740 includes circuitry, firmware, etc. necessary for the UE 1700 to communicate with various CDMA2000 networks, according to 3GPP2 standards. In some embodiments, the radio transceiver 1740 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1740 can include a transceiver that is capable of wired communication, such as by using IEEE 802.3 Ethernet technology. The functionality particular to each of these embodiments can be coupled with and/or controlled by other circuitry in the UE 1700, such as the processor 1710 executing program code stored in program memory 1720 in conjunction with, and/or supported by, data memory 1730.

User interface 1750 can take various forms depending on the particular embodiment of UE 1700, or can be absent from UE 1700 entirely. In some embodiments, user interface 1750 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1700 can comprise a tablet computing device including a larger touchscreen display. In such embodiments, one or more of the mechanical features of the user interface 1750 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1700 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1700 having a touch screen display are capable of receiving user inputs, such as inputs related to exemplary methods described herein or otherwise known to persons of ordinary skill.

In some embodiments, UE 1700 can include an orientation sensor, which can be used in various ways by features and functions of UE 1700. For example, the UE 1700 can use outputs of the orientation sensor to determine when a user has changed the physical orientation of the UE 1700's touch screen display. An indication signal from the orientation sensor can be available to any application program executing on the UE 1700, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1760 of the UE 1700 can take various forms depending on the particular exemplary embodiment of UE 1700 and of the particular interface requirements of other devices that the UE 1700 is intended to communicate with and/or control. For example, the control interface 1760 can comprise an RS-232 interface, a USB interface, an HDMI interface, a Bluetooth interface, an IEEE ("Firewire") interface, an I²C interface, a PCMCIA interface, or the like. In some exemplary embodiments of the present disclosure, control interface 1760 can comprise an IEEE 802.3 Ethernet interface such as described above. In some exemplary embodiments of the present disclosure, the control interface 1760 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1700 can comprise more functionality than is shown in FIG. 17 including, for example, a video and/or still-image camera, microphone, media player and/or recorder, etc. Moreover, radio transceiver 1740 can include circuitry necessary to communicate using additional radio-frequency communication standards including Bluetooth, GPS, and/or others. Moreover, the processor 1710 can execute software code stored in the program memory 1720 to control such additional functionality. For example, directional velocity and/or position estimates output from a GPS receiver can be available to any application program executing on the UE 1700, including any program code corresponding to and/or embodying any exemplary embodiments (e.g., of methods) described herein.

Figure 18:
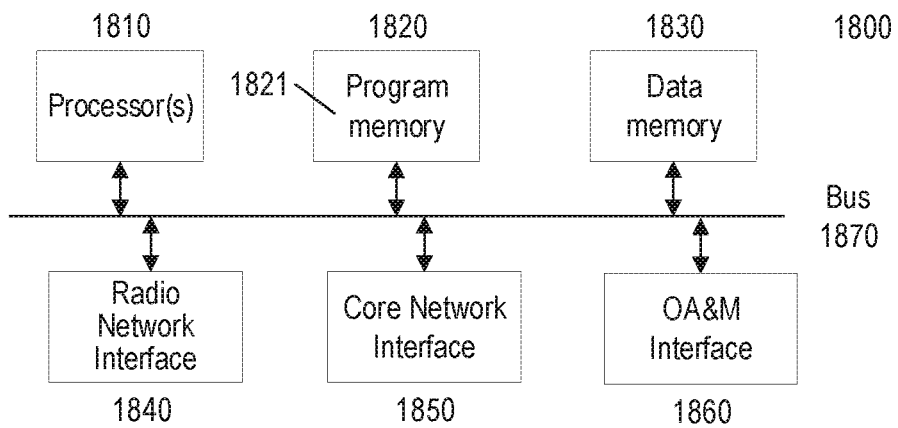
FIG. 18 shows a block diagram of an exemplary network node according to various exemplary embodiments of the present disclosure.

FIG. 18 shows a block diagram of an exemplary network node 1800 according to various embodiments of the present disclosure, including those described above with reference to other figures. For example, exemplary network node 1800 can be configured by execution of instructions, stored on a computer-readable medium, to perform operations corresponding to one or more of the exemplary methods described herein. In some exemplary embodiments, network node 1800 can comprise a base station, eNB, gNB, or one or more components thereof. For example, network node 1800 can be configured as a central unit (CU) and one or more distributed units (DUs) according to NR gNB architectures specified by 3GPP. More generally, the functionally of network node 1800 can be distributed across various physical devices and/or functional units, modules, etc.

Network node 1800 can include processor 1810 (also referred to as "processing circuitry") that is operably connected to program memory 1820 and data memory 1830 via bus 1870, which can include parallel address and data buses, serial ports, or other methods and/or structures known to those of ordinary skill in the art.

Program memory 1820 can store software code, programs, and/or instructions (collectively shown as computer program product 1821 in FIG. 18) that, when executed by processor 1810, can configure and/or facilitate network node 1800 to perform various operations, including operations corresponding to various exemplary methods described herein. As part of and/or in addition to such operations, program memory 1820 can also include software code executed by processor 1810 that can configure and/or facilitate network node 1800 to communicate with one or more other UEs or network nodes using other protocols or protocol layers, such as one or more of the PHY, MAC, RLC, PDCP, SDAP, RRC, and NAS layer protocols standardized by 3GPP for LTE, LTE-A, and/or NR, or any other higher-layer protocols utilized in conjunction with radio network interface 1840 and/or core network interface 1850. By way of example, core network interface 1850 can comprise the S1 or NG interface and radio network interface 1840 can comprise the Uu interface, as standardized by 3GPP. Program memory 1820 can also comprise software code executed by processor 1810 to control the functions of network node 1800, including configuring and controlling various components such as radio network interface 1840 and core network interface 1850.

Data memory 1830 can comprise memory area for processor 1810 to store variables used in protocols, configuration, control, and other functions of network node 1800. As such, program memory 1820 and data memory 1830 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1810 can include multiple individual processors (not shown), each of which implements a portion of the functionality described above. In such case, multiple individual processors may be commonly connected to program memory 1820 and data memory 1830 or individually connected to multiple individual program memories and/or data memories. More generally, persons of ordinary skill will recognize that various protocols and other functions of network node 1800 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1840 can comprise transmitters, receivers, signal processors, ASICs, antennas, beamforming units, and other circuitry that enables network node 1800 to communicate with other equipment such as, in some embodiments, a plurality of compatible user equipment (UE). In some embodiments, interface 1840 can also enable network node 1800 to communicate with compatible satellites of a satellite communication network. In some exemplary embodiments, radio network interface 1840 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1840. According to further exemplary embodiments of the present disclosure, the radio network interface 1840 can comprise a PHY layer based on OFDM, OFDMA, and/or SC-FDMA technologies. In some embodiments, the functionality of such a PHY layer can be provided cooperatively by radio network interface 1840 and processor 1810 (including program code in memory 1820).

Core network interface 1850 can comprise transmitters, receivers, and other circuitry that enables network node 1800 to communicate with other equipment in a core network such as, in some embodiments, circuit-switched (CS) and/or packet-switched Core (PS) networks. In some embodiments, core network interface 1850 can comprise the S1 interface standardized by 3GPP. In some embodiments, core network interface 1850 can comprise the NG interface standardized by 3GPP. In some exemplary embodiments, core network interface 1850 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1850 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1800 can include hardware and/or software that configures and/or facilitates network node 1800 to communicate with other network nodes in a RAN, such as with other eNBs, gNBs, ng-eNBs, en-gNBs, IAB nodes, etc. Such hardware and/or software can be part of radio network interface 1840 and/or core network interface 1850, or it can be a separate functional unit (not shown). For example, such hardware and/or software can configure and/or facilitate network node 1800 to communicate with other RAN nodes via the X2 or Xn interfaces, as standardized by 3GPP.

OA&M interface 1860 can comprise transmitters, receivers, and other circuitry that enables network node 1800 to communicate with external networks, computers, databases, and the like for purposes of operations, administration, and maintenance of network node 1800 or other network equipment operably connected thereto. Lower layers of OA&M interface 1860 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1840, core network interface 1850, and OA&M interface 1860 may be multiplexed together on a single physical interface, such as the examples listed above.

Figure 19:
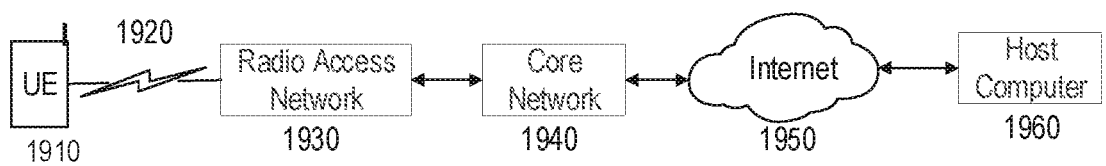
FIG. 19 shows a block diagram of an exemplary network configured to provide over-the-top (OTT) data services between a host computer and a UE, according to various exemplary embodiments of the present disclosure.

FIG. 19 is a block diagram of an exemplary communication network configured to provide over-the-top (OTT) data services between a host computer and a user equipment (UE), according to one or more exemplary embodiments of the present disclosure. UE 1910 can communicate with radio access network (RAN) 1930 over radio interface 1920, which can be based on protocols described above including, e.g., LTE, LTE-A, and 5G/NR. For example, UE 1910 can be configured and/or arranged as shown in other figures discussed above.

RAN 1930 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band.

In such cases, the network nodes comprising RAN 1930 can cooperatively operate using licensed and unlicensed spectrum. In some embodiments, RAN 1930 can include, or be capable of communication with, one or more satellites comprising a satellite access network.

RAN 1930 can further communicate with core network 1940 according to various protocols and interfaces described above. For example, one or more apparatus (e.g., base stations, eNBs, gNBs, etc.) comprising RAN 1930 can communicate to core network 1940 via core network interface 1950 described above. In some exemplary embodiments, RAN 1930 and core network 1940 can be configured and/or arranged as shown in other figures discussed above. For example, eNBs comprising an evolved UTRAN (E-UTRAN) 1930 can communicate with an evolved packet core (EPC) network 1940 via an S1 interface. As another example, gNBs and ng-eNBs comprising an NG-RAN 1930 can communicate with a 5GC network 1930 via an NG interface.

Core network 1940 can further communicate with an external packet data network, illustrated in FIG. 19 as Internet 1950, according to various protocols and interfaces known to persons of ordinary skill in the art. Many other devices and/or networks can also connect to and communicate via Internet 1950, such as exemplary host computer 1960. In some exemplary embodiments, host computer 1960 can communicate with UE 1910 using Internet 1950, core network 1940, and RAN 1930 as intermediaries. Host computer 1960 can be a server (e.g., an application server) under ownership and/or control of a service provider. Host computer 1960 can be operated by the OTT service provider or by another entity on the service provider's behalf.

For example, host computer 1960 can provide an over-the-top (OTT) packet data service to UE 1910 using facilities of core network 1940 and RAN 1930, which can be unaware of the routing of an outgoing/incoming communication to/from host computer 1960. Similarly, host computer 1960 can be unaware of routing of a transmission from the host computer to the UE, e.g., the routing of the transmission through RAN 1930. Various OTT services can be provided using the exemplary configuration shown in FIG. 19 including, e.g., streaming (unidirectional) audio and/or video from host computer to UE, interactive (bidirectional) audio and/or video between host computer and UE, interactive messaging or social communication, interactive virtual or augmented reality, cloud gaming, etc.

The exemplary network shown in FIG. 19 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide flexible and efficient techniques that address scheduling restrictions for PDSCH and corresponding HARQ when one or more of a UE's HARQ processes are disabled. These techniques can facilitate sufficient processing time for UE reception of data messages (e.g., PDSCH) associated with different HARQ processes, as well as flexibility in network scheduling and/or UE transmission of HARQ feedback when at least one of the UE's HARQ processes are disabled.

Additionally or alternatively, maintaining an out-of-order scheduling restriction based on virtual feedback for disabled HARQ processes can reduce UE complexity and cost.

When used in NR UEs (e.g., UE 1910) and gNBs (e.g., gNBs comprising RAN 1930), these improvements can increase the use of OTT data services by improving reliability of data transmissions through enhancements to HARQ performance. Consequently, this increases the benefits and/or value of such data services to end users and OTT service providers.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

A1. A method for a user equipment (UE) to transmit hybrid ARQ (HARQ) feedback for data transmissions from a wireless network, the method comprising:
  receiving, from the wireless network, a first data message associated with a first HARQ process and a second data message associated with a second HARQ process, wherein at least one of the first and second HARQ processes is disabled, and wherein the second data message is received after the first data message;
  selectively transmitting, at a first occasion after the first data message, first HARQ feedback for the first data message based on whether the first HARQ process is enabled or disabled; and
  selectively transmitting, at a second occasion after the second data message, second HARQ feedback for the second data message based on the following:
    whether the second HARQ process is enabled or disabled,
    order of the first and second occasions, and
    an out-of-order scheduling restriction.

A2. The method of embodiment A1, wherein selectively transmitting the first HARQ feedback based on whether the first HARQ process is enabled or disabled comprises:
  transmitting the first HARQ feedback when the first HARQ process is enabled; and
  refraining from transmitting the first HARQ feedback when the first HARQ process is disabled.

A3. The method of embodiment A1, further comprising:
  attempting to decode the first and second data messages; and
  determining the first and second HARQ feedback based on whether the respective decoding attempts are successful or unsuccessful and whether the respective first and second HARQ processes are enabled.

A4. The method of embodiment A3, wherein each of the first and second HARQ feedback is determined as:
  a first value or a second value based on whether the decoding attempt for the corresponding data message is successful or unsuccessful, respectively, when the corresponding HARQ process is enabled; and only one of the first and second values regardless of whether the decoding attempt for the corresponding data message is successful or unsuccessful, when the corresponding HARQ process is disabled.

A5. The method of any of embodiments A1-A4, wherein the out-of-order scheduling restriction does not apply to the first and second data messages, such that selectively transmitting the second HARQ feedback is not based on the order of the first and second occasions.

A6. The method of embodiment A5, wherein selectively transmitting the second HARQ feedback at the second occasion comprises transmitting the second HARQ feedback when the second HARQ process is enabled and the second occasion is before the first occasion.

A7. The method of any of embodiments A1-A4, wherein the out-of-order scheduling restriction applies to the first and second data messages, such that:

when the second occasion is not before the first occasion, the second HARQ feedback is selectively transmitted based on whether the second HARQ process is enabled or disabled; and when the second occasion is before the first occasion, the second HARQ feedback is not transmitted.

A8. The method of any of embodiments A1-A7, further comprising receiving the following from the wireless network:

first downlink control information (DCI) scheduling the first data message associated with the first HARQ process; and second DCI scheduling the second data message associated with the second HARQ process, wherein each DCI of the first and second DCIs includes:
a first field that indicates a HARQ process, and
a second field arranged to indicate an occasion for the UE to transmit HARQ feedback for a data message associated with the HARQ process indicated by the first field.

A9. The method of embodiment A8, wherein:
the out-of-order scheduling restriction does not apply to the first and second data messages; and
the second field of each DCI indicates an occasion for the UE to transmit HARQ feedback only when the HARQ process indicated by the first field is enabled.

A10. The method of embodiment A9, wherein when the HARQ process indicated by the first field is disabled, the occasion for the UE to transmit HARQ feedback is indicated by one of the following:
a predetermined value known by both the UE and the wireless network; or
one of the following configured by a radio resource control (RRC) message previously transmitted to the UE: a predetermined value, or a predetermined one of a plurality of values.

A11. The method of embodiment A8, wherein:
the out-of-order scheduling restriction applies to the first and second data messages; and
the second field of each DCI indicates an occasion for the UE to transmit HARQ feedback.

A12. The method of any of embodiments A1-A7, further comprising receiving, from the wireless network, a radio resource control (RRC) message that includes a dl-DataToUL-ACK parameter that identifies a common scheduling delay, wherein:
when the out-of-order scheduling restriction does not apply to the first and second data messages, the common scheduling delay indicates the first and second occasions only when the respective first and second HARQ processes are enabled; and
when the out-of-order scheduling restriction applies to the first and second data messages, the common scheduling delay indicates the first and second occasions.

A13. The method of any of embodiments A1-A12, wherein the wireless network is a non-terrestrial network (NTN).

A14. The method of any of embodiments A1-A13, wherein:
the first and second data messages are first and second physical downlink shared channels (PDSCHs); and
the out-of-order scheduling restriction comprises the UE is not expected to receive the first PDSCH in slot i, with the first HARQ feedback assigned to be transmitted in slot j, and the second PDSCH starting later than the first PDSCH with the second HARQ feedback assigned to be transmitted in a slot before slot j.

B1. A method, for a network node in a wireless network, to receive hybrid ARQ (HARQ) feedback from a user equipment (UE) for data transmissions by the network node, the method comprising:
selecting a first occasion for the UE to transmit first HARQ feedback for a first data message associated with a first HARQ process and a second occasion for the UE to transmit second HARQ feedback for a second data message associated with a second HARQ process, wherein the selecting is based on:
whether each of the first and second HARQ processes is enabled or disabled, with at least one being disabled, and
an out-of-order scheduling restriction; and
transmitting, to the UE, the first data message, the second data message, and at least one of an indication of the first occasion and an indication of the second occasion, wherein the second data message is transmitted after the first data message.

B2. The method of embodiment B1, wherein the out-of-order scheduling restriction does not apply to the first and second data messages, such that when the first HARQ process is disabled, the second occasion is selected to be before or not before the first occasion.

B3. The method of embodiment B2, further comprising receiving the second HARQ feedback from the UE, at the second occasion, when the second HARQ process is enabled and the second occasion is before the first occasion.

B4. The method of embodiment B1, wherein:
the out-of-order scheduling restriction applies to the first and second data messages; and
the method further comprises selectively receiving the second HARQ feedback from the UE, at the second occasion, based on the order of the first and second occasions and on whether the second HARQ process is enabled or disabled.

B5. The method of embodiment B4, wherein selectively receiving the second HARQ feedback at the second occasion comprises:
receiving the second HARQ feedback when the second HARQ process is enabled and the second occasion is not before the first occasion; and
otherwise, refraining from receiving the second HARQ feedback.

B6. The method of embodiment B4, wherein selectively receiving the second HARQ feedback at the second occasion comprises:

when the second HARQ process is enabled, receiving a first value and a second value when UE decoding of the second data message was successful and unsuccessful, respectively; and when the second HARQ process is disabled, receiving only one of the first and second values regardless of whether UE decoding of the second data message was successful or unsuccessful.

B7. The method of any of embodiments B1-B6, wherein transmitting at least one of the indication of the first occasion and the indication of the second occasion comprises transmitting the following to the UE:

first downlink control information (DCI) scheduling the first data message associated with the first HARQ process; and second DCI scheduling the second data message associated with the second HARQ process, wherein each DCI of the first and second DCIs includes:
a first field that indicates a HARQ process, and
a second field arranged to indicate an occasion for the UE to transmit HARQ feedback for a data message associated with the HARQ process indicated by the first field.

B8. The method of embodiment B7, wherein:
the out-of-order scheduling restriction does not apply to the first and second data messages; and
the second field of each DCI indicates an occasion for the UE to transmit HARQ feedback only when the HARQ process indicated by the first field is enabled.

B9. The method of embodiment B8, wherein when the HARQ process indicated by the first field is disabled, the occasion for the UE to transmit HARQ feedback is indicated by one of the following:

a predetermined value known by both the UE and the wireless network; or one of the following configured by a radio resource control (RRC) message previously transmitted to the UE: a predetermined value, or a predetermined one of a plurality of values.

B10. The method of embodiment B7, wherein:
the out-of-order scheduling restriction applies to the first and second data messages; and
the second field of each DCI indicates an occasion for the UE to transmit HARQ feedback.

B11. The method of any of embodiments B1-B6, wherein transmitting at least one of the indication of the first occasion and the indication of the second occasion comprises transmitting, to the UE, a radio resource control (RRC) message that includes a dl-DataToUL-ACK parameter that identifies a common scheduling delay, wherein:

when the out-of-order scheduling restriction does not apply to the first and second data messages, the common scheduling delay indicates the first and second occasions only when the respective first and second HARQ processes are enabled; and when the out-of-order scheduling restriction applies to the first and second data messages, the common scheduling delay indicates the first and second occasions.

B12. The method of any of embodiments B1-B11, wherein the wireless network is a non-terrestrial network (NTN).

B13. The method of any of embodiments B1-B12, wherein:
the first and second data messages are first and second physical downlink shared channels (PDSCHs); and
the out-of-order scheduling restriction comprises the UE is not expected to receive the first PDSCH in slot i, with the first HARQ feedback assigned to be transmitted in slot j, and the second PDSCH starting later than the first PDSCH with the second HARQ feedback assigned to be transmitted in a slot before slot j.

C1. A user equipment (UE) configured to transmit hybrid ARQ (HARQ) feedback for data transmissions from a non-terrestrial network (NTN), the UE comprising:
radio transceiver circuitry configured to communicate with a network node of the wireless network; and
processing circuitry operatively coupled to the radio transceiver circuitry, whereby the processing circuitry and the radio transceiver circuitry are configured to perform operations corresponding to any of the methods of embodiments A1-A14.

C2. A user equipment (UE) configured to transmit hybrid ARQ (HARQ) feedback for data transmissions from a wireless network, the UE being further configured to perform operations corresponding to any of the methods of embodiments A1-A14.

C3. A non-transitory, computer-readable medium storing computer-executable instructions that, when executed by processing circuitry of a user equipment (UE) configured to transmit hybrid ARQ (HARQ) feedback for data transmissions from a wireless network, configure the UE to perform operations corresponding to any of the methods of embodiments A1-A14.

C4. A computer program product comprising computer-executable instructions that, when executed by processing circuitry of a user equipment (UE) configured to transmit hybrid ARQ (HARQ) feedback for data transmissions from a wireless network, configure the UE to perform operations corresponding to any of the methods of embodiments A1-A14.

D1. A network node, in a wireless network, configured to receive hybrid ARQ (HARQ) feedback from a user equipment (UE) for data transmissions by the network node, the network node comprising:
radio network interface circuitry configured to communicate with the UE; and
processing circuitry operatively coupled to the radio network interface circuitry, whereby the processing circuitry and the radio network interface circuitry are configured to perform operations corresponding to any of the methods of embodiments B1-B13.

D2. A network node, in a wireless network, configured to receive hybrid ARQ (HARQ) feedback from a user equipment (UE) for data transmissions by the network node, the network node being further configured to perform operations corresponding to any of the methods of embodiments B1-B13.

D3. A non-transitory, computer-readable medium storing computer-executable instructions that, when executed by processing circuitry of a network node, in a wireless network, configured to receive hybrid ARQ (HARQ) feedback from a user equipment (UE) for data transmissions by the network node, configure the network node to perform operations corresponding to any of the methods of embodiments B1-B13.

D4. A computer program product comprising computer-executable instructions that, when executed by processing circuitry of a network node, in a wireless network, configured to receive hybrid ARQ (HARQ) feedback from a user equipment (UE) for data transmissions by the network node, configure the network node to perform operations corresponding to any of the methods of embodiments B1-B13.

The invention claimed is:

1. A method for a user equipment (UE) configured to transmit hybrid ARQ (HARQ) feedback for data transmissions from a wireless network, the method comprising:

receiving, from the wireless network, a first data message associated with a first HARQ process and a second data message associated with a second HARQ process, wherein at least one of the first and second HARQ processes is disabled, and wherein the second data message is received after the first data message;

selectively transmitting, at a first occasion after the first data message, first HARQ feedback for the first data message based on whether the first HARQ process is enabled or disabled; and selectively transmitting, at a second occasion after the second data message, second HARQ feedback for the second data message based on the following:

whether the second HARQ process is enabled or disabled, an order of the first and second occasions, and an out-of-order scheduling restriction applicable to data messages associated with different HARQ processes, wherein:

when the second occasion is not before the first occasion, the second HARQ feedback is selectively transmitted based on whether the second HARQ process is enabled or disabled; and when the second occasion is before the first occasion, the second HARQ feedback is not transmitted.

2. The method of claim 1, wherein selectively transmitting the first HARQ feedback based on whether the first HARQ process is enabled or disabled comprises:

transmitting the first HARQ feedback when the first HARQ process is enabled; and refraining from transmitting the first HARQ feedback when the first HARQ process is disabled.

3. The method of claim 1, further comprising:

attempting to decode the first and second data messages; and determining the first and second HARQ feedback based on whether the respective decoding attempts are successful or unsuccessful and whether the respective first and second HARQ processes are enabled.

4. The method of claim 3, wherein when the second occasion is not before the first occasion, the second HARQ feedback is selectively transmitted as:

a first value or a second value based on whether the decoding attempt for the second data message is successful or unsuccessful, respectively, when the second HARQ process is enabled; and only one of the first and second values regardless of whether the decoding attempt for the second data message is successful or unsuccessful, when the second HARQ process is disabled.

5. The method of claim 1, further comprising receiving the following from the wireless network:

first downlink control information (DCI) scheduling the first data message associated with the first HARQ process; and second DCI scheduling the second data message associated with the second HARQ process, wherein each DCI of the first and second DCIs includes:

a first field that indicates a HARQ process, and a second field arranged to indicate an occasion for the UE to transmit HARQ feedback for a data message associated with the HARQ process indicated by the first field.

6. The method of claim 5, wherein:

the out-of-order scheduling restriction applies to the first and second data messages; and the second field of each of the first and second DCIs indicates an occasion for the UE to transmit HARQ feedback.

7. The method of claim 1, further comprising receiving, from the wireless network, a radio resource control (RRC) message that includes a dl-DataToUL-ACK parameter that identifies a common scheduling delay, wherein the common scheduling delay indicates the first and second occasions.

8. The method of claim 1, wherein the wireless network is a non-terrestrial network, NTN.

9. The method of claim 1, wherein:

the first and second data messages are first and second physical downlink shared channels (PDSCHs); and the out-of-order scheduling restriction comprises that the UE is not expected to receive the first PDSCH in slot i, with the first HARQ feedback assigned to be transmitted in slot j, and the second PDSCH starting later than the first PDSCH with the second HARQ feedback assigned to be transmitted in a slot before slot j.

10. A method, for a network node configured to operate in a wireless network, to receive hybrid ARQ (HARQ) feedback from a user equipment (UE) for data transmissions by the network node, the method comprising:

selecting the following based on an out-of-order scheduling restriction applicable to data messages associated with different HARQ processes:

a first occasion for the UE to transmit first HARQ feedback for a first data message associated with a first HARQ process, and a second occasion for the UE to transmit second HARQ feedback for a second data message associated with a second HARQ process, wherein at least one of the first and second HARQ processes is disabled;

transmitting the following to the UE:

the first data message;

the second data message, after the first data message; and at least one of the following indications: an indication of the first occasion, and an indication of the second occasion; and selectively receiving the second HARQ feedback from the UE at the second occasion, wherein:

when the second occasion is not before the first occasion, the second HARQ feedback is selectively received from the UE at the second occasion based on whether the second HARQ process is enabled or disabled; and when the second occasion is before the first occasion, the second HARQ feedback is not received.

11. The method of claim 10, wherein when the second occasion is not before the first occasion, the second HARQ feedback is selectively received from the UE at the second occasion as:

when the second HARQ process is enabled, a first value or a second value when UE decoding of the second data message was successful or unsuccessful, respectively; and when the second HARQ process is disabled, only one of the first and second values regardless of whether UE decoding of the second data message was successful or unsuccessful.

12. The method of claim 10, wherein transmitting the at least one indication comprises transmitting the following to the UE:

first downlink control information (DCI) scheduling the first data message associated with the first HARQ process; and
second DCI scheduling the second data message associated with the second HARQ process,
wherein each DCI of the first and second DCIs includes:
a first field that indicates a HARQ process, and
a second field arranged to indicate an occasion for the UE to transmit HARQ feedback for a data message associated with the HARQ process indicated by the first field.

13. The method of claim 12, wherein the second field of each DCI indicates an occasion for the UE to transmit HARQ feedback.

14. The method of claim 10, wherein:
transmitting the at least one indication comprises transmitting, to the UE, a radio resource control (RRC) message that includes a dl-DataToUL-ACK parameter that identifies a common scheduling delay; and
the common scheduling delay indicates the first and second occasions.

15. The method of claim 10, wherein:
the first and second data messages are first and second physical downlink shared channels (PDSCHs); and
the out-of-order scheduling restriction comprises that the UE is not expected to receive the first PDSCH in slot i, with the first HARQ feedback assigned to be transmitted in slot j, and the second PDSCH starting later than the first PDSCH with the second HARQ feedback assigned to be transmitted in a slot before slot j.

16. A user equipment (UE) configured to transmit hybrid ARQ (HARQ) feedback for data transmissions from a wireless network, the UE comprising:
radio transceiver circuitry configured to communicate with a network node of the wireless network; and
processing circuitry operatively coupled to the radio transceiver circuitry, whereby the processing circuitry and the radio transceiver circuitry are configured to:
receive, from the wireless network, a first data message associated with a first HARQ process and a second data message associated with a second HARQ process, wherein at least one of the first and second HARQ processes is disabled, and wherein the second data message is received after the first data message;
selectively transmit, at a first occasion after the first data message, first HARQ feedback for the first data message based on whether the first HARQ process is enabled or disabled; and
selectively transmit, at a second occasion after the second data message, second HARQ feedback for the second data message based on the following:
whether the second HARQ process is enabled or disabled,
an order of the first and second occasions, and
an out-of-order scheduling restriction applicable to data messages associated with different HARQ processes, wherein:
when the second occasion is not before the first occasion, the second HARQ feedback is selectively transmitted based on whether the second HARQ process is enabled or disabled; and
when the second occasion is before the first occasion, the second HARQ feedback is not transmitted.

17. A network node configured to receive hybrid ARQ (HARQ) feedback from a user equipment (UE) for data transmissions by the network node in a wireless network, the network node comprising:
radio network interface circuitry configured to communicate with the UE; and
processing circuitry operatively coupled to the radio network interface circuitry, whereby the processing circuitry and the radio network interface circuitry are configured to:
select the following based on an out-of-order scheduling restriction applicable to data messages associated with different HARQ processes:
a first occasion for the UE to transmit first HARQ feedback for a first data message associated with a first HARQ process, and
a second occasion for the UE to transmit second HARQ feedback for a second data message associated with a second HARQ process,
wherein at least one of the first and second HARQ processes is disabled;
transmit the following to the UE:
the first data message;
the second data message, after the first data message; and
at least one of the following indications: an indication of the first occasion, and an indication of the second occasion; and
selectively receive the second HARQ feedback from the UE at the second occasion, wherein:
when the second occasion is not before the first occasion, the second HARQ feedback is selectively received from the UE at the second occasion based on whether the second HARQ process is enabled or disabled; and
when the second occasion is before the first occasion, the second HARQ feedback is not received.

* * * * *